(12) United States Patent
Wygnaski

(10) Patent No.: US 7,021,603 B2
(45) Date of Patent: Apr. 4, 2006

(54) ELECTROMAGNETIC ACTUATOR AND INTEGRATED ACTUATOR AND FLUID FLOW CONTROL VALVE

(76) Inventor: Wladyslaw Wygnaski, 24 Craister Ct., Cambridge, CB4 2SL (GB)

( * ) Notice: Subject to any disclaimer, the term of this patent is extended or adjusted under 35 U.S.C. 154(b) by 208 days.

(21) Appl. No.: 10/449,486

(22) Filed: May 30, 2003

(65) Prior Publication Data

US 2004/0025949 A1    Feb. 12, 2004

Related U.S. Application Data

(63) Continuation-in-part of application No. 09/807,043, filed as application No. PCT/GB99/03327 on Oct. 7, 1999, now Pat. No. 6,598,621.

(30) Foreign Application Priority Data

| Oct. 8, 1998 | (GB) | 9821842 |
| Apr. 1, 1999 | (GB) | 9907552 |
| May 29, 1999 | (GB) | 9912518 |
| Jun. 21, 1999 | (GB) | 9914330 |
| May 31, 2002 | (GB) | 0212656 |
| Jul. 4, 2002 | (GB) | 0215465 |
| May 10, 2003 | (GB) | 0310835 |
| May 23, 2003 | (GB) | 0311879 |

(51) Int. Cl.
*F16K 31/08* (2006.01)

(52) U.S. Cl. .............. 251/129.15; 251/65; 310/20; 310/23

(58) Field of Classification Search ............ 251/65, 251/129.15, 129.09, 129.1; 310/15, 23, 20
See application file for complete search history.

(56) References Cited

U.S. PATENT DOCUMENTS 2,785,873 A * 3/1957 Holmes et al. ........ 251/129.09

FOREIGN PATENT DOCUMENTS

DE         29711175 U1      7/1998

* cited by examiner

*Primary Examiner*—Kevin Lee
(74) *Attorney, Agent, or Firm*—Barnes & Thornburg, LLP

(57) ABSTRACT

A magnetic device is formed from a permanent magnet generating magnetic flux, an armature which can occupy two positions between four poles and an electromagnet winding to which current can be supplied to produce a magnetic flux in one direction or the other, the flux from the winding causing the armature to move into one position and continue to remain in that position after the current flow ceases. The device can be incorporated into a fluid valve to act as a drive for opening and closing the valve. It may also serve as the drive for opening and closing electrical contacts. Monostable operation can be achieved by locating a magnetic flux shunt at one end of the armature travel. A holding solenoid may be incorporated. A pivoting armature in a fluid tight chamber comprises a fluid flow controlling device. It can adopt either of two home positions in contact with two magnetic poles and is retained by magnetic flux from a permanent magnet. Fluid can flow into and out of the chamber via a first passage. A second passage extends through one of the poles to an opening in the pole face which is covered by the armature when the latter occupies one home position but is uncovered when the armature occupies its other home position. A third fluid passage extends through and leads to a second opening in another pole, which is covered when the armature occupies its said other home position. Passages in the poles house energy storing springs each of which is compressed as the armature approaches the pole. A push rod can extend through a passage in one of the poles for conveying armature movement externally of the device.

63 Claims, 15 Drawing Sheets

Safety valve-bistabile mode

Safety valve-mono-stabile mode calibrated valves A, B, C.

safety valve

Direct driver

Magnetic bridge two magnets position up two magnets position down single magnet position down

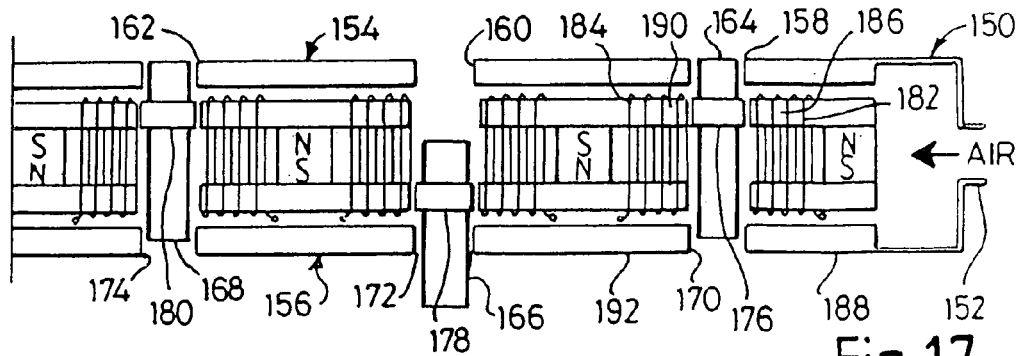
Fig. 17
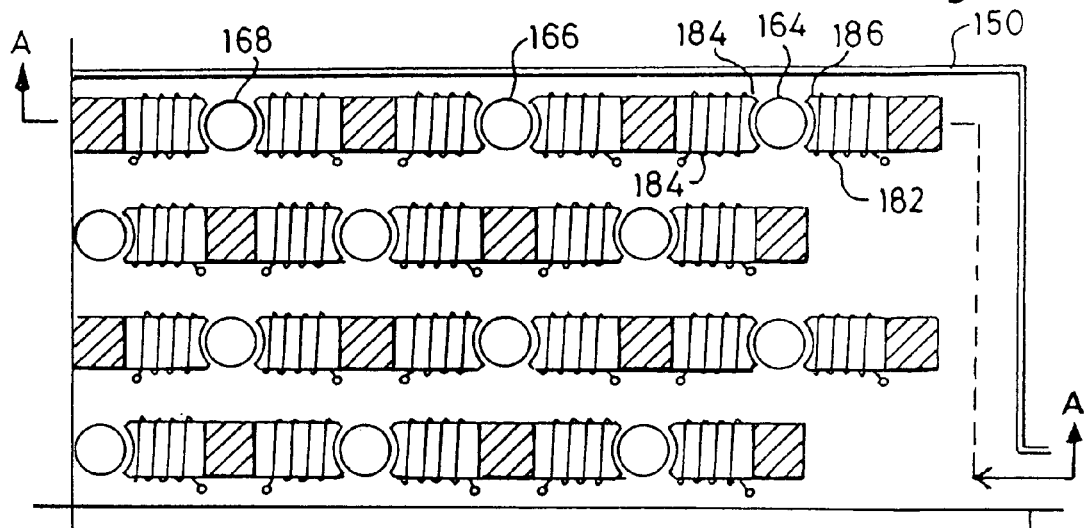
Fig. 18
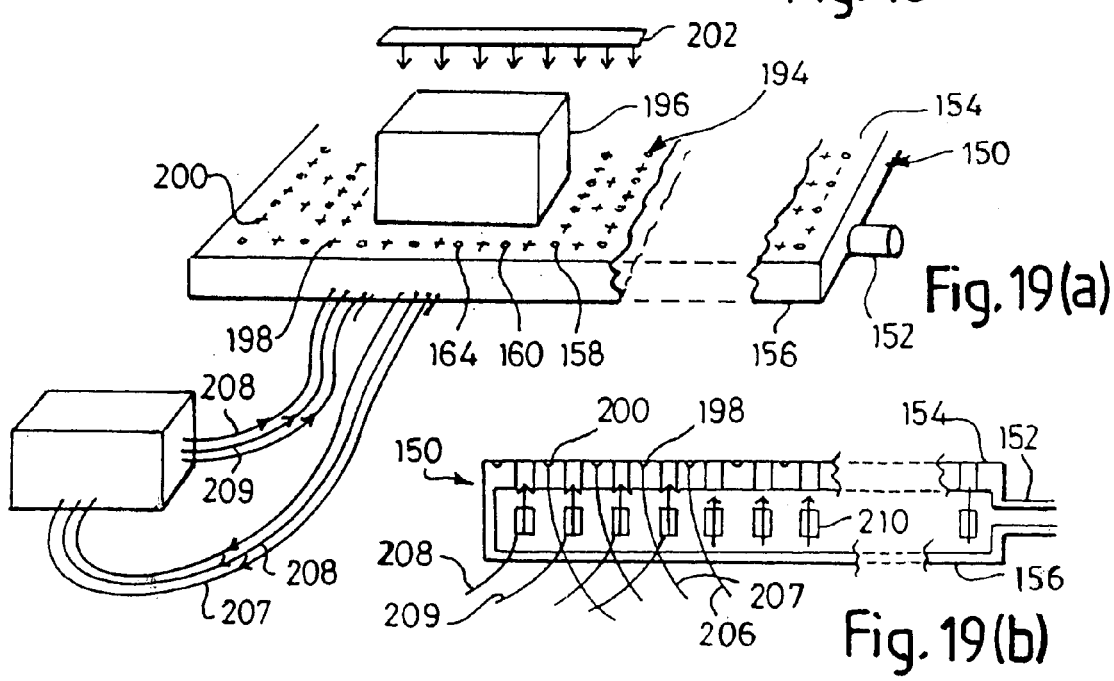
Fig. 19(a)
Fig. 19(b)

ELECTROMAGNETIC ACTUATOR AND INTEGRATED ACTUATOR AND FLUID FLOW CONTROL VALVE

RELATED APPLICATION

This application is a continuation-in-part of U.S. patent application Ser. No. 09/807,043, filed Apr. 6, 2001 now U.S. Pat. No. 6,598,621, which is the national filing of international application number PCT/GB99/03327 filed Oct. 7, 1999.

FIELD OF INVENTION

This invention concerns electromagnetic actuators and in particular a design of actuator which can be integrated into a fluid flow control valve. Such valves can be used to control gas or liquid flow, and actuators can be made to open and close electrical switch contacts.

BACKGROUND TO THE INVENTION

Magnetic attraction and repulsion is commonly employed as a motive force to operate devices such as valve closure members, pistons in cylinders to achieve a pumping action, and contactors and switches for opening and closing electrical circuits.

Such drives may have a bistable or monostable characteristic, and often employ a spring force to provide a restoring force and create a monostable operating characteristic.

Magnetic fields to achieve the operation are usually generated by causing an electric current to flow in a winding surrounding a ferromagnetic core or the like, which if the magnetic field is to collapse when the current flow ceases (as is usually required), is usually constructed from a magnetisable material having a low magnetic permanence.

Where valves control the flow of inflammable or poisonous gases or fluids, it is usual to design the magnetic drive therefor to be monostable and to have a so-called fail-safe characteristic in the event of a power failure. By fail-safe is meant that the valve will revert to a closed condition in the event that there is an electrical power failure.

Devices incorporating the invention obviate the need to provide electric current continuously to maintain the operational state of the device which may have a monostable or bistable characteristic.

PRIOR ART

UK 1,513,966 describes electromagnetic switching devices, FIGS. 10 and 11 of which show such a device in which an armature 3 can rock between two points under the influence of electric current produced changes in the flux linking the armature and four poles 6, 6' 7 and 7'. In FIG. 11 springs are shown permanently linking one end of the armature two of the poles, to centre the armature between the poles. Examples of the centring springs are shown in FIGS. 12 and 13.

In both devices shown in FIGS. 10 and 11 of UK 1,513,966 a layer of non-magnetic material from which the coil bobbin is constructed, exists between the ends of the magnets and the magnetic material forming the poles 6, 6', 7 and 7' respectively. This significantly weakens the flux density available to attract and hold the armature in contact with poles 6 and 7' (or 6' and 7). In fact, unless current is flowing in the solenoid coil of the FIG. 11 device, the armature appears to be held by the centring springs midway between the poles, out of contact therewith. That device is therefore not a truly bistable device, but can adopt an intermediate third state, in which the armature makes no contact with any of the poles. In fact since the springs shown centre the armature in the absence of current in the coil, the forces exerted by the springs on the armature are greater than the force of attraction due to the permanent magnet, and it is only when the magnetic force acting on the armature is increased by the flux due to the current flowing in the coil, that the spring forces are overcome and the armature will move into contact with one or the other set of poles 6 and 7' or 6' and 7.

An electromagnetic actuator is described in U.S. Pat. No. 4,621,660 Specification which employs permanent magnets, a pivoting armature and a winding through which an electric current is passed to shift the armature from one position to another. The armature co-operates with ports and passages in a housing containing the actuator so as to cover and uncover openings therein to control the flow of fluid from one passage to another. However no attempt is made to store energy during armature movement, subsequently to accelerate the armature in transit between its two positions. The actuator does not therefore have a fast response time. In addition the armature will impact against the new poles as it transfers from one pair of poles to the other, and this can introduce significant wear and shorten the life of the device.

OBJECTS OF THE INVENTION

It is an object of the present invention to provide an improved form of actuator and an improved fluid flow control valve incorporating such an actuator.

It is another object of the present invention to provide a bistable magnetic actuator and a valve operated by such an actuator which does not require a continuous current flow to maintain it in either of its stable states.

Another object of the present invention is to provide a magnetic actuator and a valve operated by such an actuator so as to have a bistable characteristic, but which can be readily modified to possess a monostable characteristic so that it will revert to (or remain in) one of its two states in the event of a power failure.

It is a further object of the invention to provide a mechanical device for altering the characteristics of a bistable magnetic device, to those of a monostable device.

It is a still further object of the invention to provide an improved fluid flow control valve.

It is a still further object of the invention to provide a gas flow control valve with a safety characteristic which reverts to a closed state in the event of the failure of a monitored source of energy such as an electrical current flow, a source of heat, or a source of light.

SUMMARY OF THE INVENTION

According to one aspect of the present invention there is provided a magnetic drive device formed from permanent magnet means generating magnetic flux between pairs of poles, an armature mounted for movement enabling it to occupy either a rest position in a first air gap between one pair of poles in which the flux is in one direction, or a rest position in a second air gap between another pair of poles in which the flux is in the opposite direction, with a region of flux cancellation between the two air gaps, and at least one electromagnet winding having an axis generally perpendicular to the path of movement of the armature to which current can be supplied to produce a magnetic flux in said one direction or the other, depending on the direction of the current, the flux from the winding increasing the flux density in the other air gap, thereby effectively shifting the flux cancellation region towards or into one of the two air gaps so as to produce a flux density gradient extending from one air gap to the other which will cause the armature to move into (or remain in) the air gap having the higher flux density, in which the armature will continue to remain after the current flow ceases, and wherein energy storing means is provided engagable by the armature at one end of the armature travel which is only engaged as the armature approaches its rest position, thereby to absorb energy from the final movement of the armature into its rest position at that end of its travel.

According to another aspect of the present invention a fluid flow control valve comprises a fluid tight chamber to which or from which fluid can flow via a first passage, an elongate magnetic armature which constitutes the fluid flow controlling device and is movable between two home positions between two pairs of magnetic poles, and which in doing so passes through a mid position between the two home positions, a permanent magnet the flux from which links the armature and the poles in each home position and will cause the armature to move towards and remain between two of the poles in each home position, an electromagnet which when energised by an appropriate flow of current will alter the magnetic flux to cause the armature to be repelled from two poles between which it extends and to move through its mid position and thereafter towards the other two poles defining the other home position, a second fluid passage which is open to convey fluid into and out of the chamber when the armature occupies one home position but is closed by the armature when it occupies its other home position, and energy storage means which has no effect of the armature in or near its mid position, but is engaged by the armature as it approaches each of its two home positions and resists the final movement of the armature into each home position.

Preferably energy storing means engagable by the armature only as it approaches its rest position, is located at both ends of the armature travel.

Preferably in use the winding both polarises the armature and changes the magnetic flux in the air gaps.

Low reluctance flux concentrating means may be provided external to the electromagnet winding which provides a low reluctance external path for returning flux from one end to the other thereof when the winding is energised, thereby to increase the flux produced by the winding when energised, so as to magnify the magnetic flux available to effect movement of the armature.

The external flux concentrating means typically comprises at least one elongate member of magnetisable material which extends parallel to the magnetic flux in the air gap and generally perpendicular to the direction of movement of the armature and beyond the extent of its travel.

In a preferred arrangement four similar elongate magnetisable pole pieces are arranged symmetrically in pairs, each pair occupying one of the two magnetic fields, and the air gap between the pole pieces in each pair defines the air gap at each of the two extremes of the armature travel, the two pairs of pole pieces serving to concentrate the internal magnetic flux into the two said air gaps.

A flux concentrator may be located close to one end of the armature travel so as to produce a drive having a monostable characteristic.

In a preferred arrangement a flux concentrator is movable relative to the device, so as to adopt a first position relatively close to the device to reduce the flux density at one end of the armature travel, thereby causing the device to assume a monostable characteristic, and is movable out of the first position into a second position where it has little or no influence on the flux density in the device, so as to reinstate the bistable characteristic thereof.

Typically a single permanent magnet is employed at one end of an electromagnet coil having located internally thereof two pairs of aligned, spaced apart pole pieces, defining air gaps at opposite ends of the armature travel, and an elongate member of magnetisable material is provided at the opposite end of the coil formed from material similar to that from which the pole pieces are formed, such that flux issuing from one of the two nearer internal pole pieces passes into and through the magnetisable material to issue from the other end thereof and pass into the other of two nearer internal pole pieces, the elongate member of magnetisable material thus providing a return path for the flux to maintain the flux direction at each end of the armature travel in the same way as a second permanent magnet, in place of the elongate member, would do.

Field focusing pole pieces are preferably provided at opposite ends of the electromagnetic winding.

A pair of electrical contacts may be provided at one end of the armature travel, which are electrically joined by being bridged by conductive means moved into contact therewith by armature movement, to form a switch.

A pair of electrical contacts also may be provided at the other end of the armature travel, for bridging by conductive means when the armature moves in an opposite sense, to form additional switch contacts.

The armature may be constructed from electrically conductive means, or the conductive means may be a conductive layer, or conductive member, carried by the armature.

The contacts which are to be closed by movement of the armature will usually be situated at the same end of the armature travel to which it has moved to close same, and may be located within a sealed chamber.

At least part of the wall of such a chamber may be formed from electrically insulating material to provide a region for conductive feedthroughs to terminals external of the chamber, to allow electrical connection to be made to the contacts therein.

The chamber may be formed at least in part from plastics or glass or quartz.

A holding solenoid may be located within the drive at the end which is to be affected by the flux shunting element.

A magnetic drive embodying the invention may be adapted to control the position of a closure member of a pneumatic or hydraulic valve, or the movable member of an electrical switch, effecting closure or opening of the contacts thereof.

A magnetic device embodying the invention may be combined with a valve adapted to control the flow of an inflammable gas to a burner or jet.

Such a combination may further comprise a thermocouple located adjacent the burner or jet so as to be heated by a flame emanating therefrom to cause an electric current to flow in any circuit connected to the thermocouple, and wherein the latter either produces, or controls the production of, the holding current for the solenoid at the shunted field end, and is such as to produce a magnetic flux sufficient to retain the armature in contact therewith at the shunted field end provided the thermocouple remains heated by the flame, whereby in the event of flame failure, the thermocouple cools, the holding current collapses and with it the magnetic flux linking the holding solenoid to the armature, thereby releasing the latter and enabling it to move to the higher flux concentration at the other end of its travel.

Alternatively such a combination may be constructed so as to have a fail-safe characteristic in which a flux short circuiting device is mounted on a movable element, the position of which relative to the drive is controlled by a physical parameter which changes in the event of some failure (such as flame failure in a gas burner) which will result in the movable element shifting the flux shunting device from a position in which a relatively large air gap exists between it and the magnetic flux at one end of the drive, into a position in which the shunting element diverts most or all the said flux to significantly reduce the flux density at that end of the armature travel and cause the armature either to move to the other end of the drive to where the magnetic flux remains unaffected, or to remain at that said other end.

The position of the movable element may be controlled by the passage of an electric current, or is dependent upon a particular voltage being present, or a gas or fluid pressure being exerted against the movable element.

The movable element may be a bimetal strip, a piezo bender, a spring, a diaphragm or other device which will move under increasing or decreasing pressure.

The mechanism which determines the instantaneous position of the flux shunting element may be adapted to respond to an increase in a monitored parameter such as temperature or pressure as well as or instead of a decrease, so that the flux shunting device can be moved into position so as to divert the flux at one end of the drive, either in response to flame failure (in the case of a gas burner) or in the event of excess temperature.

The armature may be formed from magnetisable material, and in order to reduce its mass, magnetic poles are located at opposite ends of the drive with a relatively small gap between the two pairs of opposed magnetic pole faces, and the magnetisable part of the armature is reduced in size so as to just fit in the small gap between the pair of opposed pole faces at opposite ends of the drive, the said magnetisable part of the armature being secured to one end of a low mass connecting rod which extends through an end of the magnetic drive to terminate externally thereof.

The connecting rod may be formed from non-magnetic material.

A magnetic device as aforesaid may be combined with a chamber to or from which fluid can flow depending on the position of a valve closure member relative to a valve seating surrounding an opening in the chamber wall, in which the position of the armature determines the position of the closure member and in one end position of the armature the closure member closes the valve, and in the other end position of the armature, the closure member is clear of the valve seating.

A diaphragm seal may be provided around the connecting rod, and the diaphragm material is selected so as to be impervious to the fluid in the chamber and is sufficiently flexible to permit linear movement of the connecting rod in response to movement of the magnetic armature.

The diaphragm may be generally circular in shape, may include a corrugated annular region to provide flexibility and displaceability of its central region relative to the circumference thereof, and may be centrally perforated to allow the connecting rod to extend therethrough, but be sealed to the connecting rod, typically to a collar on the rod, the collar forming an integral part of or being sealingly fitted to the rod, and the periphery of the diaphragm may be likewise bonded or otherwise sealingly joined to a larger diameter collar which is sealingly joined or integrally formed with an end wall of the magnetic drive assembly, which may form at least part of one wall of the fluid chamber into which the connecting rod and valve closure member extends.

The chamber may comprise part of a common manifold containing other similar chambers with a magnetic drive associated with each chamber and each chamber includes an orifice and the orifices differ in size, and the drives are selected in such a manner that by opening different ones of the orifices, either alone, or in combination with other opening orifices, different effective overall orifice sizes can be obtained, so as to regulate the flow of fluid through the valves from the manifold, the overall open orifice area determining the rate of flow from the manifold for a given pressure differential.

Preferably the different overall areas of orifice openings which can be obtained, constitute each of a sequence of opening areas such that a progression of areas from zero to a maximum area (when all the valves are open) can be obtained in a series of discrete steps.

The invention also lies in a plurality of similar magnetic devices in combination, adapted to open and close each of a corresponding plurality of valves for controlling the exit of fluid under pressure from a manifold constituting a reservoir of the said fluid, and the electromagnet winding of each drive is connectable to a source of electric current, and control means is provided to establish the connections to the source of current and the direction of current flow in each winding.

In a manifold and valve combination as aforesaid the control means may be under computer control, and the latter may be programmable to open and close the valves in a sequence, or one or more patterns, or in a sequence of patterns, and each valve may include an orifice through which fluid, such as gas or air, can pass when the valve is opened.

The orifices may be equally spaced apart in a single line, or in a plurality of lines or in a regular pattern or series of patterns, or pseudo randomly.

The spacing between the orifices in the lines, and between the lines, may be the same, the lines being parallel and the locations of the orifices along the lines being such that they align in directions perpendicular to the parallel lines, so as to define a matrix of rows and columns of equally spaced apart orifices.

Typically the orifices all exist in a flat plane.

Typically the angle of the plane to the horizontal is such as to provide a support surface for objects located thereon.

In a preferred arrangement the orifices are located in a flat plate forming one wall of the manifold, and in such an arrangement the programmed control means can be adapted to cause fluid to be released by orifices below an object situated thereover, so that the object will be lifted on a cushion of fluid escaping from the opened orifices, and once so lifted, can be moved freely across the surface. Preferably sensors are provided to detect which of the orifices are in registry with the object and to control the electrical connections to the electromagnet windings of the drives so as to open valves of orifices below the object and to close valves not in registry with the object.

Signals from the sensors may be monitored continuously or repetitively and the valves may be opened and closed in response to movement of the object relative to the orifices so that the load supporting cushion of air will travel with an object as the latter moves relative to the orifices.

The orifices may be located in two or more planes, which may be at right angles.

The invention also lies in an air cushion load support platform comprising a manifold as described above and a source of fluid under pressure for supplying the manifold.

The invention also lies in an air cushion conveyor comprising a platform as described which extends along the direction along which objects are to be conveyed, and guides are provided above the surface of the platform which define a route therealong for the said objects, which when sensed, are elevated by the air released from thereunder.

In an alternative arrangement the orifices may be located in a curved surface comprising the wall of a passage extending through a manifold containing fluid under pressure, and the control means opens and closes the valves to release fluid from different ones of the apertures within the passage.

The passage may be cylindrical or rectangular in cross-section.

The manifold may be annular and an array of orifices may be provided in the internal surface defining the opening therethrough, each controlled by a magnetic drive controlled valve, and the internal surface may comprise part of the wall of a passage through which gas or air flows.

The manifold may contain gas or air, and the control means may be programmed to open and close the valves so as to selectively inject pulses of gas or air into the gas or air flow, to control turbulence in the flow.

An annular manifold as aforesaid may form part of the wall of an inlet or outlet of a turbine, or the wall of the exhaust or inlet of a jet engine, or the wall of a pipeline carrying gas or air.

According to another aspect of the present invention there is provided a fluid flow control valve in which an armature is mounted for pivoting in a fluid tight chamber to which or from which fluid can flow via a first passage, and the armature comprises the fluid flow controlling device and can adopt either of two home positions in each of which it is held in contact with two magnetic poles by magnetic flux provided by a permanent magnet, wherein the armature is caused to pivot from one home position to the other by temporarily altering the magnetic flux linking the armature and the poles so that the armature is repelled from poles with which it is in contact and attracted to poles defining the other home position, and wherein a second fluid passage is provided through one of the poles which communicates with an opening in the pole face which is covered by the armature so as to prevent fluid flow between the second passage and the chamber when the latter is in one of its two home positions but is uncovered to permit fluid flow through the second passage when the armature occupies its other home position.

A third fluid passage leading to a second opening may be provided in another pole, which second opening will be covered when the armature occupies its said other home position.

In a preferred embodiment four similar pole-pieces are arranged in two pairs, associated with opposite ends of the armature, each pair presenting a North and South pole to the armature, and the two pairs are arranged symmetrically about the central pivoting axis of the armature and at least one permanent magnet is linked to the pole-pieces to provide a permanent magnetic flux so that the two poles on one side of the armature have the same magnetic polarity as do the two poles on the other side of the armature.

In another embodiment also comprising four similar pole-pieces symmetrically arranged in two pairs as aforesaid, the poles are linked by magnetic material to form a flux path between the two poles on one side of the armature and the two poles on the other side of the armature, and the armature includes at least one permanent magnet to provide a permanent magnetic flux and create a North pole at one end and a South pole at the other end of the armature.

Preferably all four poles have a similar passage therein so as to have a similar magnetic cross-section, although where a passage is not required to convey fluid to or from the chamber, it need not extend completely through the pole.

Advantageously the passages in the pair of poles not required for fluid flow serve to house energy storing springs each of which will be compressed to store energy as the armature approaches the pole containing the spring, but from which the armature becomes disengaged as it pivots towards the other pole The poles comprise stops which limit the pivoting movement of the armature.

The armature may be mounted for rocking about a ridge defining a fulcrum, or between an opposed pair of such ridges or for pivoting about an axis defined by a pin about which the armature can rotate.

In the preferred embodiment the armature extends in an axial sense through an electromagnet having a winding through which electric current can flow and is polarised magnetically in one sense when a current flows in one direction in the winding and in an opposite sense when a current flows in the opposite direction.

In the said other embodiment the magnetic material linking the poles comprises at least in part the core of an electromagnet having a winding through which current flow in one sense will alter the magnetic flux so as to reverse the polarity of the poles previously magnetised by the permanent magnet flux from the armature magnet, so as to cause the armature to be repelled from the poles with which it is in contact and be attracted to the other two poles.

By ensuring that the residual permanent magnet flux linking the armature in each home position is sufficient to hold the armature in that home position, the device has a bistable characteristic, and it is merely necessary to cause a pulse of current to flow in the electromagnet winding in the appropriate direction, to cause the armature to pivot from one home position to the other, where it will remain due to the residual permanent magnet flux linking it to the other poles to which it has moved.

Preferably a closed flux path for the permanent magnet flux is created when the armature occupies either of its two home positions.

The movement of the armature may also be employed to open or close a second valve external to the device, or to open and close an electrical switch or perform a mechanical function externally of the device, and may act directly or indirectly thereon.

In a preferred arrangement a push rod can extend through a passage in one of the poles for conveying armature movement externally of the device.

Preferably the push rod is of non-magnetic material.

The push rod can extend through one or other of the poles containing a fluid conveying passage or through a passage containing an energy storing spring and may be linked to the spring to be urged by the spring towards the armature, stop means preventing the push rod from following the armature all the way to its mid position between the poles so that the armature is free of spring influence over part of its travel from between the poles.

The invention also lies in an actuator which includes a bi-stable rocking armature which is movable between two home positions each defined by a pair of poles, by altering magnetic flux created by a permanent magnet and linking the armature and the poles when it occupies one of its home positions, so as to cause the armature to rock like a see-saw into the other of its two home positions, in each of which a closed low reluctance path for magnetic flux linking the armature and two of the poles is created, the permanent magnetic flux linking the armature in either home position causing it to remain in that position in contact with those two poles until the flux linking the armature to those two poles is altered so as to cause the armature to disengage therefrom and see-saw over to the other two poles, where it will remain due to the low reluctance path now established with these other two poles, wherein part of the magnetic force of attraction between the armature and poles is converted into potential energy and stored while the armature remains in either home position to be available to exert an accelerating force on the armature in a direction away from that home position towards its other home position when the magnetic flux is altered so as to cause the armature to disengage from the poles defining that home position.

Energy may be stored in a resiliently deformable device such as a spring.

Preferably two springs are provided one compressed as the armature moves into engagement with one pole and the other of which is compressed as the armature moves into engagement with the other pole.

The poles comprise stops which limit the rocking see-saw movement of the armature.

The armature may be mounted to rock about a ridge defining a fulcrum, or between an opposed pair of such ridges or to pivot about an axis defined by a pin about which the armature can rotate The force exerted by the stored energy is arranged to be less than the force of attraction due to the flux linking the armature and pole piece once the low reluctance path has been established.

Typically the flux alteration required to effect the changeover of the armature from one pole to the other is effected by causing a short pulse of current to flow through an electromagnet winding which influences the flux linking the armature and the poles, the direction of the current in each pulse to effect each changeover, being selected accordingly.

In one arrangement in which the or each permanent magnet forms part of the low reluctance path out with the armature, an electromagnet winding surrounds the armature, so as to reverse the magnetic polarity of the armature otherwise caused by permanent magnet originating flux, when a current flows in one direction in the winding.

In another embodiment in which the or each permanent magnet forms part of the armature, the core of the electromagnet preferably forms part of the low reluctance flux path between the poles so that when energised, the flux created by the current flowing in the winding reverses the magnetic polarity of the poles from that created by the permanent magnetic flux, to cause the repulsion of the armature therefrom.

In either embodiment the reversal of the magnetic polarity of the armature, or the poles to which it is attracted, causes the armature to be repelled from the poles to which it was hitherto attracted, and to become attracted to the other two poles.

Resilient spring means may be associated with one or both ends of the armature.

In a preferred arrangement the spring means is associated with and held captive in a recess in the end face of each of one of the pairs of poles. A thrust member may protrude beyond each said end face for engagement by the armature to transmit armature movement to compress the spring means and vice versa.

One end of the armature, as measured from the axis about which the armature rocks, may be longer than the other so that the distance moved by the one end of the armature is greater than that of its other end.

Alternatively one end of the armature may be extended by an elongate element which need not be of magnetisable material, so that the end of the elongate element moves through a greater distance than does either end of the armature itself.

An elongate spring may be attached to the armature so as to extend beyond one or both ends of the armature or be attached to the housing or a member attached to the housing. The or each spring comprises a length of resilient material which extends from the armature to protrude from the end thereof, and may be a length of spring steel. The (or each) spring may be secured in any convenient manner at its end remote from the armature but preferably is held captive in such a way that the length of spring material beyond the armature is bent so as to describe one or other of two catenaries and can flex and flip from one catenary to the other to allow the armature to rock about the ridge (or ridges), and as the spring is deflected with armature movement so energy is stored in the spring whose deflection will tend to resist movement of the armature towards its home positions.

The captive end of the or each spring may be received in a socket in the housing or in blocks fixed in, or to, the housing.

The movement of the armature can be used to open and close a valve, or open and close an electrical switch, or perform a mechanical function, and may act directly or indirectly thereon.

In a preferred arrangement the recesses housing energy storing means enagagable as the armature approaches the poles may be formed in passages through the poles.

The actuator may be located within a housing and a passage in each of one or more poles can communicate with a passage or passages in the housing for conveying fluid to or from the housing, and through which fluid flow will be prevented by engagement of the armature with a pole containing a passage.

A push rod engagable by the armature, for conveying armature movement externally of the device, can pass through a passage in a pole, so that armature movement can operate an externally located switch or valve or other device. The push rod may extend freely through the passage especially if used for conveying fluid, or may be a sliding fit therein.

The push rod may instead extend through a passage containing an energy absorbing spring and may to advantage be linked to the spring so as to be urged thereby towards the armature, and stop means is provided to prevent the push rod from following the armature all the way to its mid position between the poles so that the armature is free of spring influence over part of its travel between poles.

According to another aspect of the present invention an electromagnetic actuator includes an elongate magnetisable armature which is pivotable in a see-saw manner between two home positions in contact with poles of magnetic material and in doing so passes through a mid position equidistant from the poles, but will remain in one home position or the other due to magnetic attraction between it and two of the poles, wherein a closed low reluctance path for magnetic flux is created by the armature making contact with two of the poles when in each home position, and the low reluctance path includes at least one permanent magnet the flux from which creates the force of attraction between the armature and the home position poles with which it is in contact thereby maintaining the armature in that home position, and an electromagnet is provided having a winding through which electric current can flow, which when energised by an appropriate current flow will alter the magnetic flux so as to cause the armature to be repelled from the poles it is in contact with and be attracted to the other two, so as to cause it to transfer to the other two poles, and wherein resilient energy storage means is provided which has no effect on the armature in or near its mid position but as the armature approaches the poles, resists the final movement of the armature towards the poles.

The or each permanent magnet may comprise part of the armature so as to permanently form a North pole at one end and a South pole at the other end, in which event the electromagnet is positioned so as to create magnetic flux in the low reluctance path external of the armature, so that when the current flows in one direction the magnetic poles created by the permanent magnet flux and to which the armature is attracted are reversed, causing the armature to be repelled therefrom towards the other two poles.

Alternatively the or each permanent magnet may comprise part of the low reluctance path external of the armature in which event the electromagnet is positioned relative to the armature so that when current flows in one direction magnetic flux is produced which reverses the magnetic polarity of the armature causing it to be repelled from the poles it is in contact with, and attracted towards the other two poles.

By changing the direction of current flow in the electromagnet winding during each energisation, each current pulse will shift the armature between its two home positions.

Each resilient energy storage means is selected so that it will exert an increasing force on the armature as it moves towards the pole which will decelerate the armature as it approaches the pole but is insufficient to overcome the increasing force of magnetic attraction between the armature and the pole as the former closes on the latter, thereby to reduce the impact force as the armature contacts the pole and to store energy from the deceleration of the armature which energy is available to accelerate the armature away from the pole if the magnetic flux linking the armature and pole is reduced.

The poles comprise stops which limit the rocking movement of the armature.

A ridge constituting a fulcrum may define the pivoting axis of the armature. Alternatively two such ridges may be provided, one above and the other below the armature, so as to define a rocking axis for the armature. Alternatively the armature may be mounted for pivoting about a fixed axis as defined by a pin, which typically is fixed inside the electromagnet core.

The permanent magnet, pole pieces and electromagnet, may be contained within a housing.

The housing may be formed from magnetisable material and comprise part of low reluctance magnetic flux path.

When located in a housing, movement of the armature can be transmitted externally of the housing, for example by means of a push rod.

The resilient energy storage means may act between the armature and a fixed point such as the housing or a member attached to the housing, but in a preferred configuration the resilient means acts between the armature and at least some of the poles.

The resilient energy storage means may be carried by and extend from the armature or be attached to and extend from the poles.

Preferably the resilient energy storage means is housed in recesses in two of the poles and armature engaging members protrude from the faces of the poles each of which will be engaged by the armature and pushed into its recesses to compress the resilient energy storage means therein as the armature approaches its pole.

Push rod means can extend through one or more passages in the poles for conveying armature movement externally of the device.

Preferably the push rod means is of non-magnetic material.

Where the energy storage means comprises a compressible spring, a push rod can extend through the spring and may be linked thereto to be urged by the spring towards the armature, stop means serving to prevent the push rod from following the armature all the way to its mid position between the poles so that the armature is free of spring influence over part of its travel between poles.

The invention also lies in a fluid flow control valve comprising:
1) a housing defining a chamber to which or from which fluid can flow via an opening on the housing wall,
2) an armature adapted to rock like a see-saw about a fulcrum between four poles which define two bistable home positions of the armature, in one of which it makes contact with two of the poles, and in the other of which it makes contact with the other two poles, the armature and poles being located within the housing,
3) at least one permanent magnet,
4) a flux path between pairs of the poles which is completed when the armature is in either of its two home positions, magnetic flux originating from the permanent magnet linking the armature and the two poles with which it is in contact and serving to hold the armature in contact therewith,
5) a curved surface in the middle of the armature which is received in and makes contact with a complementary curved surface between two of the poles, the curved surface on the armature having a radius of curvature which is smaller than that of the other curved surface, so that it rolls with respect to the latter as the armature rocks between its two home positions and the fulcrum being located at the centre of the complementary curved surface,
6) at least one opening in the complementary curved surface which is covered by the curved surface on the armature when the latter is in one home position and is uncovered when the armature is in its other home position, to control the flow of fluid therethrough, and
7) spring means creating a force which acts on the armature urging the curved surfaces into contact.

Preferably the spring force acts so as to assist the rocking movement of the armature as soon as it moves out of a mid position towards one or the other of its two home positions.

A second opening may be provided in the complementary curved surface which is covered when the armature occupies the said other home position and is uncovered when the armature occupies its said one home position.

The armature is moveable from one home position to the other by altering the magnetic flux linking the armature and the poles so as to cause the armature to be repelled from the two poles it is in contact with and to be attracted towards the other two poles.

The magnetic flux may be altered by moving a magnet (permanent or an electromagnet) into proximity with the device.

Alternatively a stationary electromagnet is provided which when energised alters the magnetic flux linking the armature and the poles to effect the changeover of the armature from one home position to the other.

The or each permanent magnet may be incorporated into the armature or the flux path between the poles.

Where the magnet forms part of the armature the electromagnet preferably forms part of, or influences the flux in, the flux path between the poles.

Where the magnet forms part of the flux path between the poles, the electromagnet is positioned so as to influence the magnetic polarity of the armature, so that when a current flows in one direction in the winding of the electromagnet, the armature polarity becomes opposite to that which is created by the permanent magnet flux, thereby to cause the armature to be repelled by the poles it is in contact with, and be attracted towards the other two poles.

Preferably energy storing springs are located in one pair of the poles, each of which is engaged and compressed by the armature as it moves into contact with the pole containing the spring, so that whichever home position the armature occupies one or the other of the two springs is compressed, thereby converting some of the kinetic energy of the armature into potential energy, which is stored in the spring until the armature is released from that home position, when the potential energy is available to accelerate the armature away from that home position towards the other home position.

Preferably the complementary curved surface includes a depression into which the fulcrum protrudes.

The curved armature surface may be part spherical (i.e. part of a sphere) and the complementary curved surface is preferably part cylindrical (i.e. part of a cylinder).

An actuator embodying the invention, whether stand-alone or combined with a chamber to form a fluid control valve, is essentially bi-stable in that after the permanent magnetic flux is altered to produce the pivoting see-saw action of the armature, the magnetic flux linking the armature and poles in the low reluctance path now established, will be sufficient to cause the armature to remain in that position in contact with those poles. It will remain there until the magnetic flux linking the armature and the poles is altered once again to cause the armature to disengage from those two poles and transfer back to the other two.

The flux alteration may be effected by moving a magnet (which may be a permanent magnet or an electromagnet) into the proximity of the device so as to temporarily alter the permanent magnet flux holding the armature in its one home position, to cause the armature to move to its other home position. Alternatively the flux alteration may be achieved by causing an electric current to flow albeit momentarily in a winding of an electromagnet which influences the magnetic polarity of the armature or the magnetic polarity of the two poles with which it makes contact in the one home position, to produce a repulsion between the armature and the poles it is in contact with and an attraction towards the other two.

By mounting the pole-pieces defining the poles, permanent magnet, electromagnet (where provided) and armature in a housing, and providing passages in the housing which communicate between inlet and outlet ports in the exterior of the housing and the passage in the or each pole or in a curved surface engaged by a curved surface on the armature for opening and closing same, so an integrated fluid flow control valve and actuator is formed.

The use of resilient energy storing means in an actuator (whether alone or integrated with a fluid flow control valve), significantly reduces the reaction time of the armature, (that is the time to pivot or rock like a see-saw from one home position to the other). It also increases electrical efficiency since the energy (derived from the permanent magnet flux) stored in the resiliently deformable means during the final movement of the armature into contact with the poles, reduces the electric current required to generate sufficient reverse magnetic flux to overcome the residual magnetic retention force acting on the armature, to free the armature to pivot or rock to its other home position.

When resilient energy storing means is incorporated, the armature will normally achieve its maximum speed at the middle of the changeover from one pole to the other (i.e. midway between a pair of poles defining the two home positions). After passing through the mid position and engaging the resiliently deformable means associated with the other pole a force now acts on the armature which begins to resist onward movement of the armature towards the other pole, so that the instantaneous speed of the armature thereafter is progressively reduced, and some of the kinetic energy of the armature is converted into potential energy and stored in the energy storage means as the latter is compressed to permit the armature to approach and make contact with the said other pole, and the landing of the armature in its new position in contact with the said other pole can be almost without impact.

Typically the armature is constructed from ferromagnetic material, for example mild steel, and preferably is constructed as a laminated sandwich of thin strips of ferromagnetic material in order to reduce losses caused by eddy currents.

In general the magnetic flux change to cause the armature to move to the other home position needs to oppositely magnetically polarise the armature or the static poles.

Such an arrangement is extremely beneficial securing not only fast response, requiring low driving energy, but more especially also long life span.

DESCRIPTION OF ILLUSTRATED EMBODIMENTS

The invention will now be described by way of example with reference to the accompanying drawings, in which:—

FIG. 17 is a cross-section through a matrix array of orifices controlled by valves opened and closed by magnetic drives;

FIG. 18 is a plan view of part of the array of FIG. 17;

FIG. 19 illustrates a control system for a valve controlled matrix array of orifices incorporating magnetic drives embodying the invention.

Figure 21:
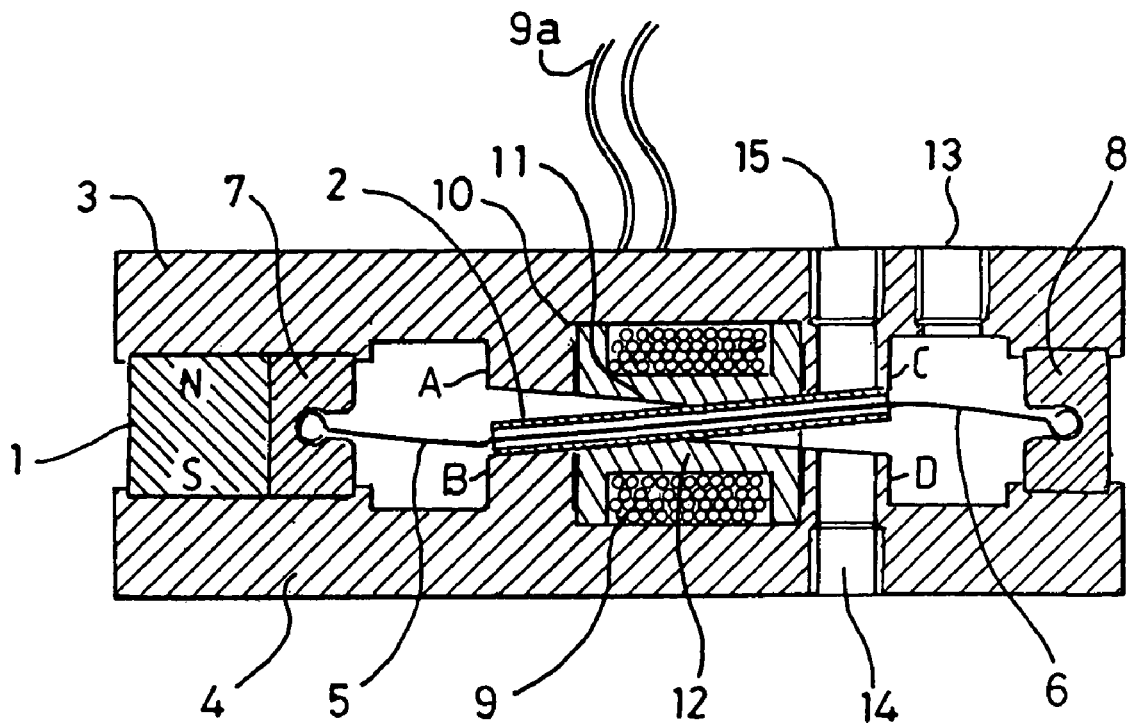
Figure 22:
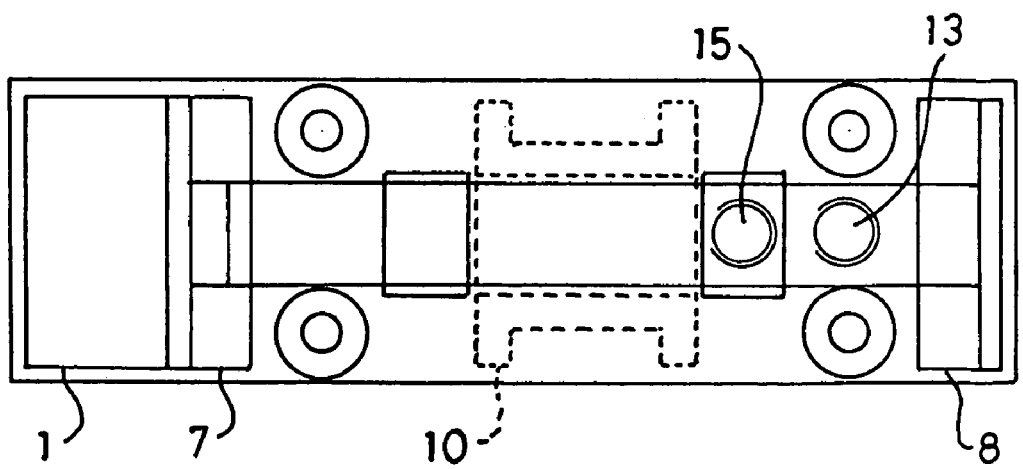
Figure 23:
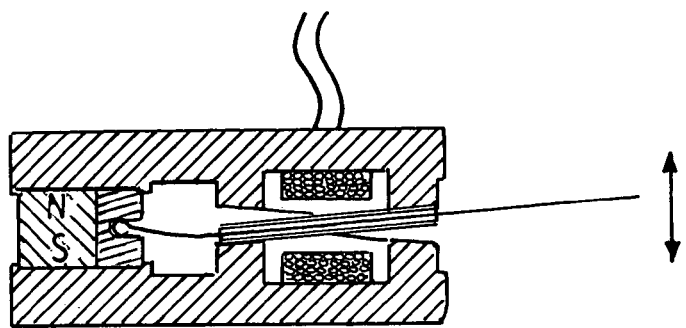
Figure 24:
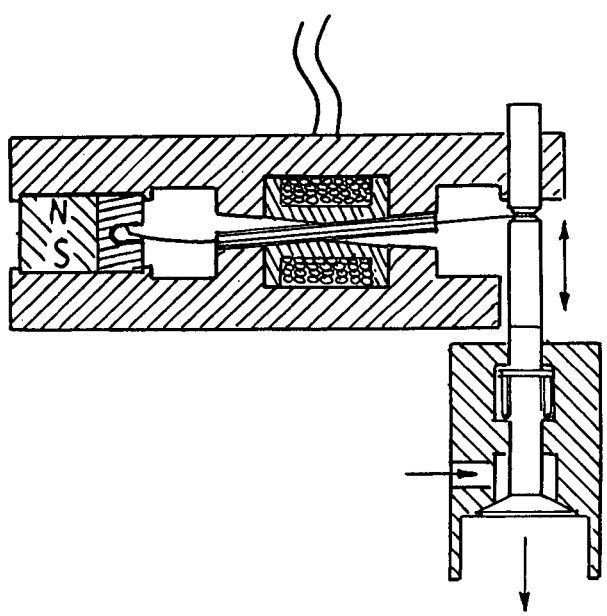
Figure 25:
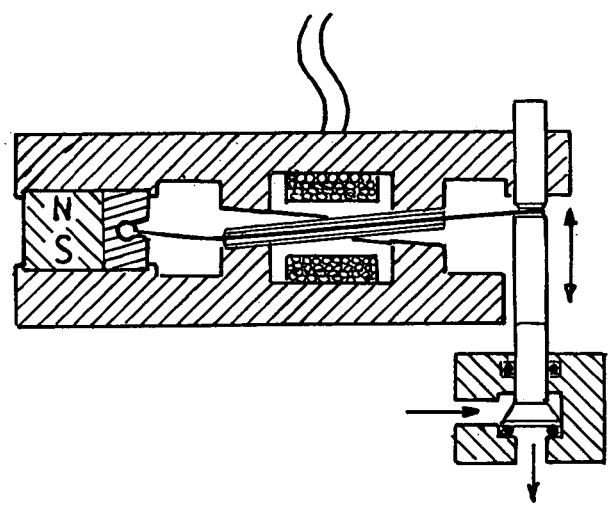
Figure 26:
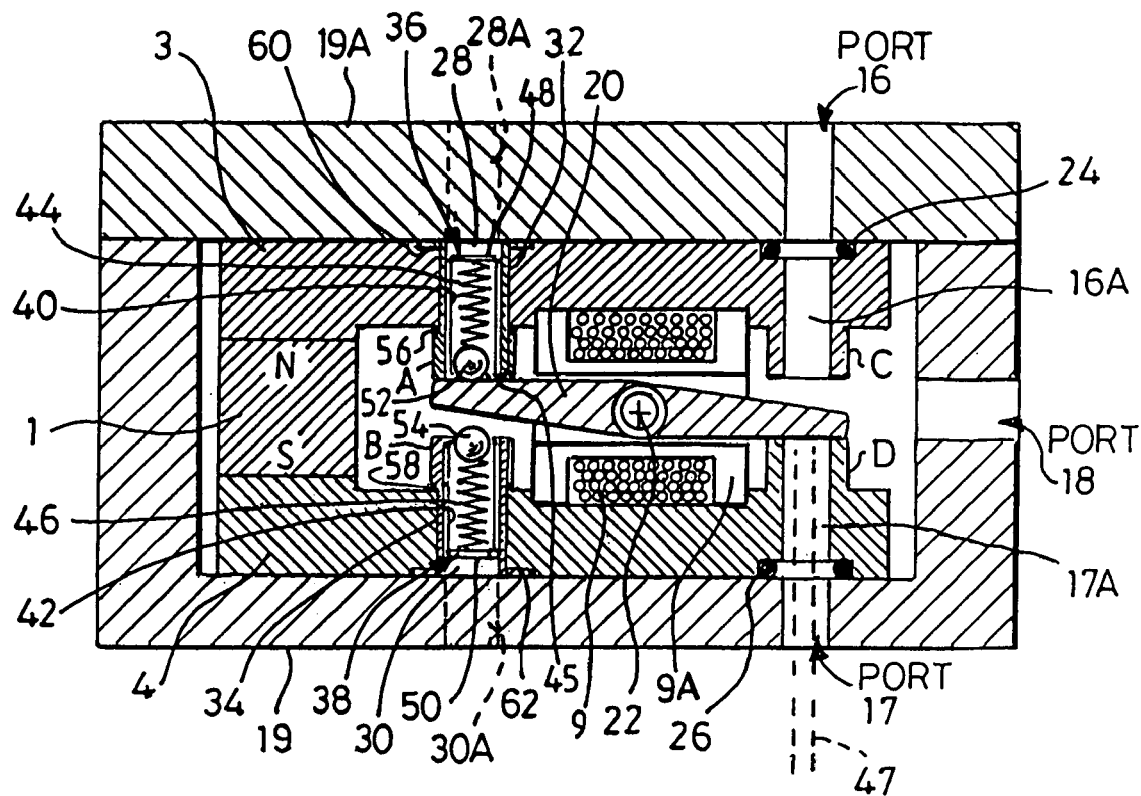
Figure 26A:
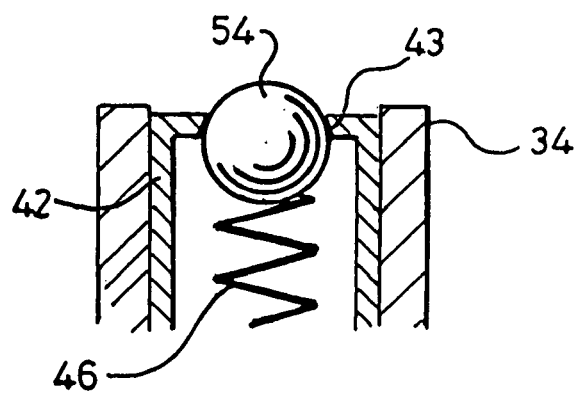
Figures 27, 28:
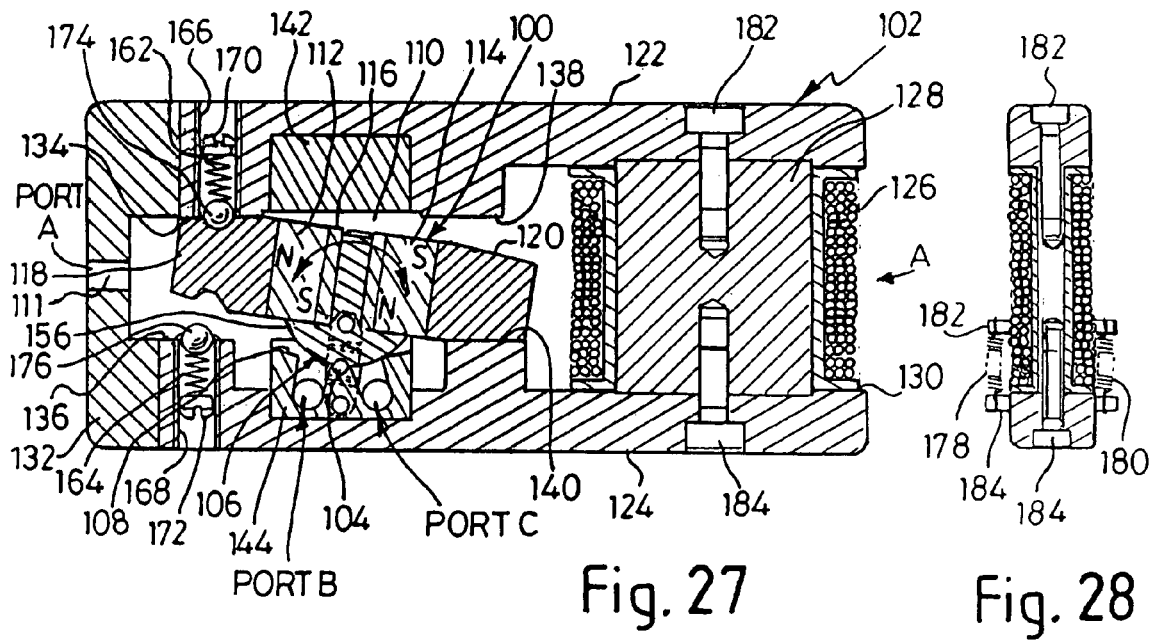
Figure 29:
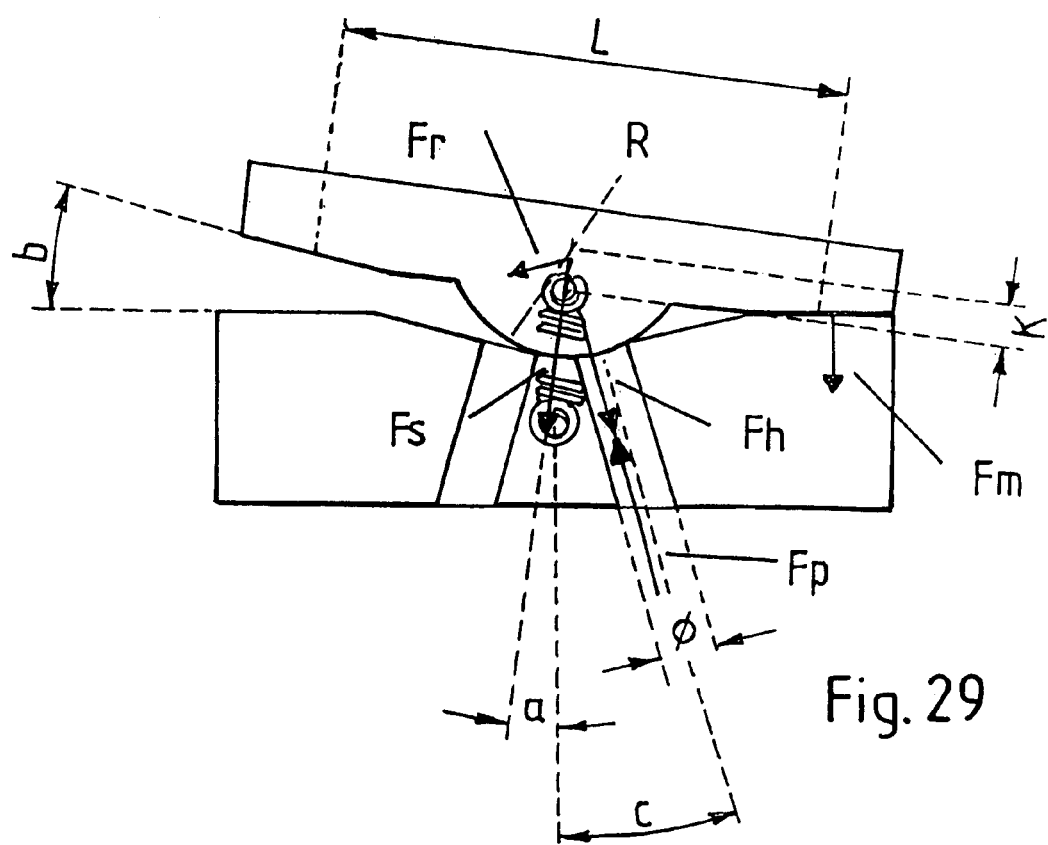
Figure 30:
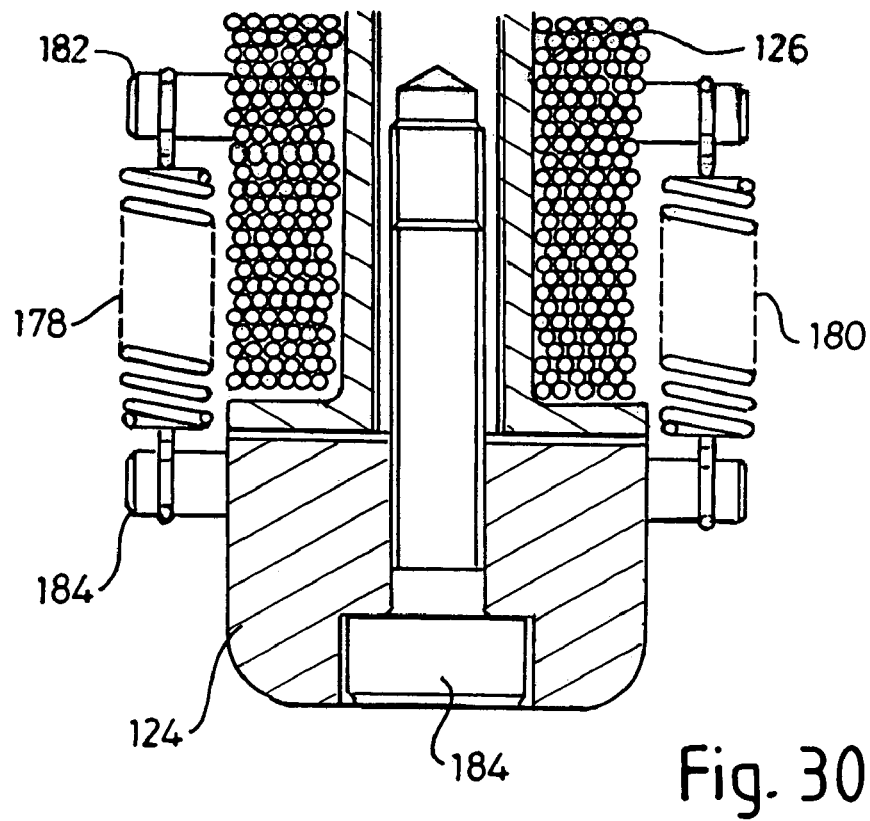
Figure 31:
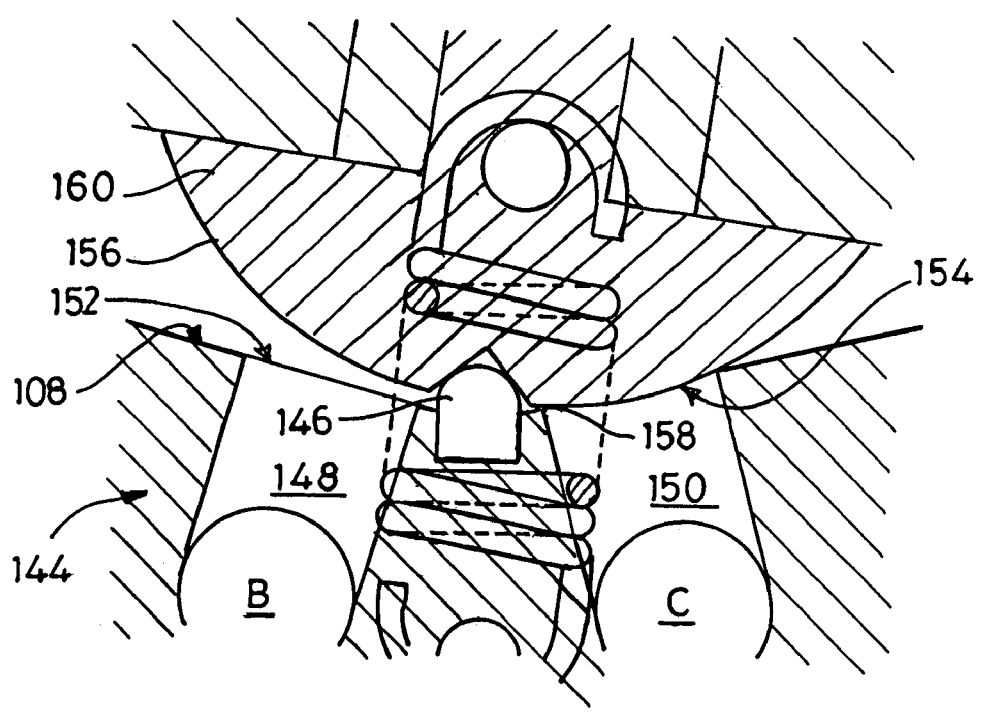

FIG. 21 is a cross-sectional side elevation of an integrated valve and magnetic actuator constructed as one embodiment of the invention, for controlling the flow of fluid between an inlet and outlet ports, FIG. 22 is a plan view of the device shown in FIG. 21, FIG. 23 is a cross-sectional side elevation of a modified form of the actuator shown in FIG. 21, constructed as another embodiment of the invention, FIGS. 24 and 25 are cross-sectional side elevations of integrations of the actuator of FIG. 23 with two different poppet valves for controlling the flow of fluid between inlet and outlet ports, FIG. 26 is a cross-sectional side elevation of another integrated valve and magnetic actuator constructed as a further embodiment of the present invention for controlling the flow of fluid between an inlet and outlet ports, FIG. 26A is a scrap section through pole B of FIG. 26, FIG. 27 is a cross sectional side view of another integrated valve and magnetic actuator constructed as a still further embodiment of the invention for controlling the flow of fluid between inlet and outlet ports, FIG. 28 is an end view of the device of FIG. 27, taken in the direction of arrow A, FIG. 29 is a diagrammatic view of the armature and valve seating arrangement of FIG. 27 to an enlarged scale, FIG. 30 is a scrap section to an enlarged scale of the lower end of the device shown in FIGS. 27 and 28, and FIG. 31 is an enlarged view of the central rolling element forming part of the armature of the device of FIGS. 27 and 28.

IN THE DRAWINGS

Figure 1:
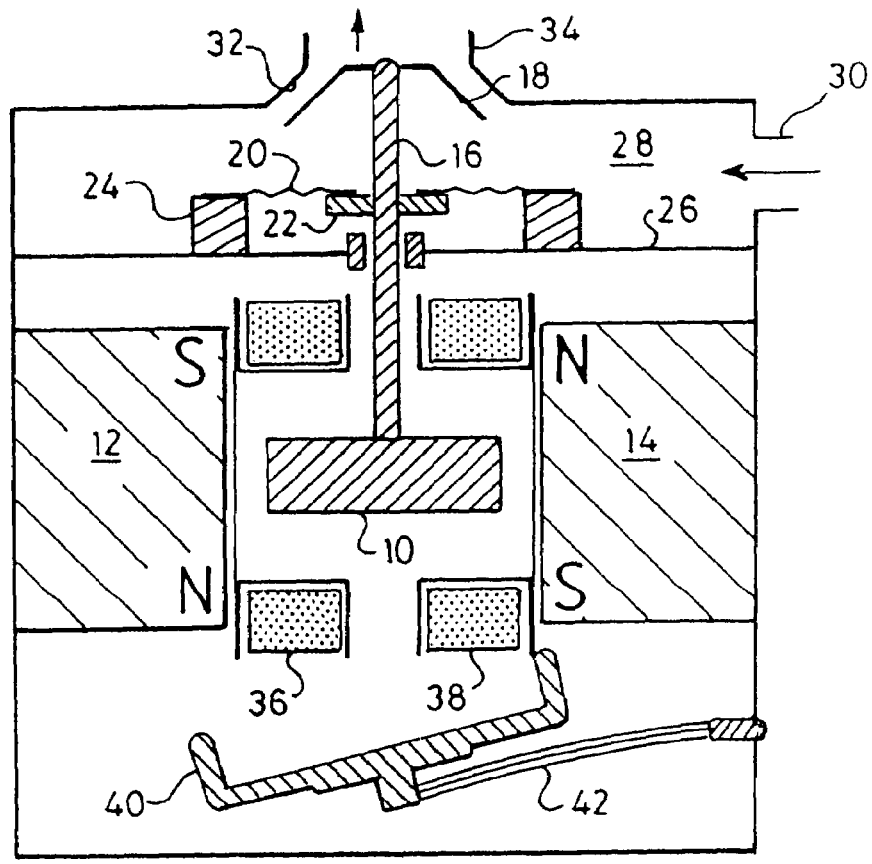
FIG. 1 is a cross-section through a magnetic drive which can be bistable or monostable depending on whether or not a flux short-circuiting element is in position.

In FIG. 1 an armature 10 is movable between the poles of a pair of magnets 12 and 14 arranged so as to produce two opposed fields at opposite ends of the travel of the armature. The latter is attached to a rod 16 to the upper end of which is attached a valve closure member 18. A diaphragm seal 20 extends between a collar 22 around the rod 16 and a second collar 24 attached to a wall 26 between the chamber 28 to which gas or liquid can be supplied via inlet opening 30 and which can exit when the valve closure member 18 is in the position shown displaced from a valve seat 32, by escaping through the outlet 34.

The armature 10 will attempt to align with one or the other of the two cross fields of the upper or lower end of the its travel and can be induced to move from one end to the other by passing a current through windings 36 and 38 in one direction or the other so as to either reinforce the flux at one end or reinforce the flux at the other.

Since reinforcement of magnetic flux in one of the cross fields will automatically reduce the flux in the other field, the effect of the current in the windings 36 and 38 will be to generate a flux gradient from one end of the armature travel to the other and the latter will tend to move towards the position of maximum flux density.

Since the device has a bistable characteristic, it is only necessary to supply a pulse of energy to the coils 36 and 38 to produce the flux gradient, and therefore the transition of the armature from one end to the other. Once the armature has moved into the position of maximum flux density, it will remain there, even if the current ceases to flow in the windings 36 and 38, which re-establishes the two cross fields as they were. The reason for this is that there is no tendency for the armature to move across the region of lower flux density between the two cross fields and it will tend to remain in one or the other of the two extreme positions at the top or bottom of its travel.

As shown in FIG. 1, the armature is actually mid-way between its two extreme positions.

As shown in FIG. 1, a flux concentrator and therefore short circuiting device 40 is mounted on a piezo bender 42 or a bi-metal strip such that the supply of appropriate electrical energy (potential or current) to the device 42 will cause the latter to be bent in the manner shown in FIG. 1 thereby holding the device 40 away from the end of the magnet 12 and 14.

In the event of the voltage or current failing, the piezo bender or bi-metal strip 42 will tend to straighten causing the device 40 to move closer to the two opposite poles of the magnets 12 and 14, and magnetic flux will tend to be attracted to two poles 42 and 44 and will be concentrated into the structure of the device 40 if the latter is formed from magnetisable material. Typically it is formed from a ferromagnetic material or other suitable magnetisable material.

The effect of the flux attraction will be to induce opposite magnetic poles in the poles 42 and 44 from those adjoining them in the magnets 12 and 14 causing attraction and closure of any gap between the device 40 and the magnets 12 and 14.

The device 40 will therefore tend to clamp itself onto the lower end of the two magnets 12 and 14, and most of the flux which would normally extend between the two lower poles of the two magnets 12 and 14 will be concentrated into and extend through the device 40.

The net effect is that the magnetic flux density in the cross field at the lower end of the assembly of FIG. 1 will collapse to a very low level and a flux gradient will exist between the lower end of the assembly and the upper end.

If the armature 10 is already at the upper end, there will be no tendency for it to move.

If however the armature is at the lower end, the armature will tend to move up the gradient to the upper end of the assembly where the flux density is highest and to remain in that position.

Figure 2:
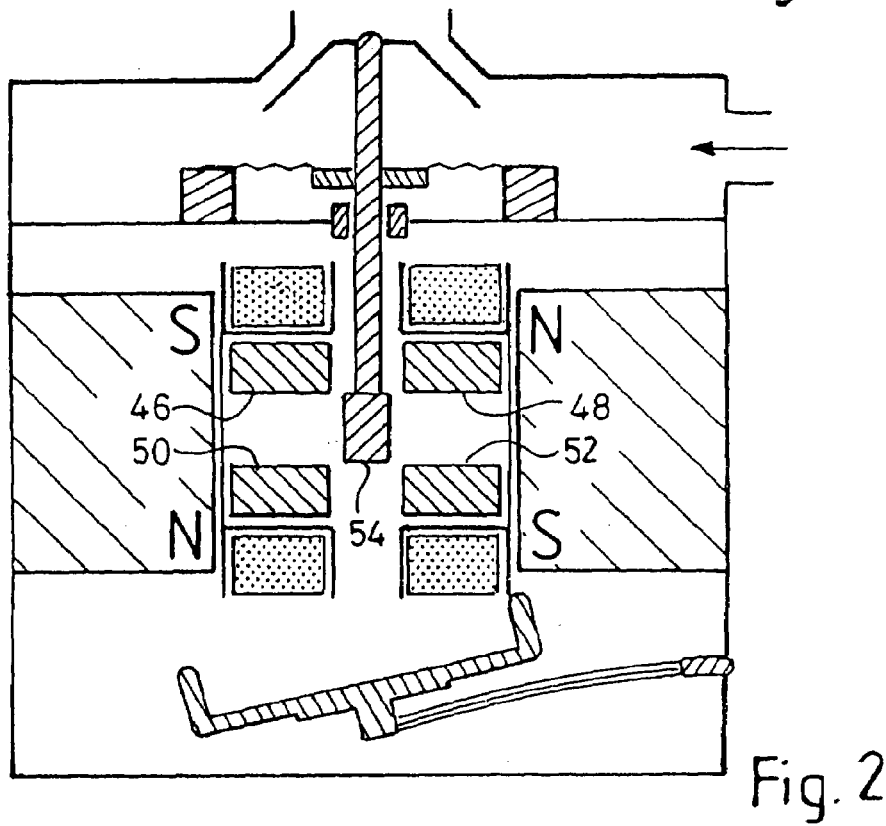
FIG. 2 illustrates a similar arrangement to that of FIG. 1, but in which the armature is split into a number of parts most of which are stationary so as to reduce the mass of the moving part of the armature.

FIG. 2 illustrates the same arrangement as shown in FIG. 1, but here the armature has been divided into four stationary parts 46 and 48 at the upper end and 50 and 52 at the lower end of the armature travel and the latter has been reduced to a small element of magnetisable material 54 which will just fit with a small gap between the elements 46 and 48 when the armature is at the upper end and between 50 and 52 when it is at its lower end of its travel.

The elements 46 to 52 essentially comprise pole piece extensions of the magnets 12 and 14.

The remaining parts of the device are as described in relation to FIG. 1.

Figure 3:
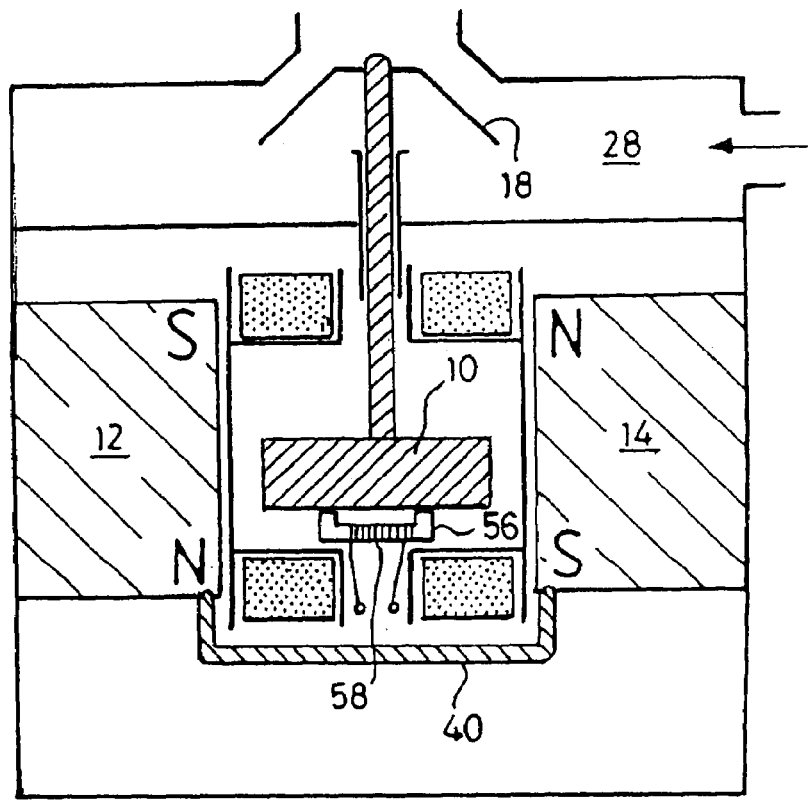
FIG. 3 is a further cross-section through a device similar to that of FIG. 1 in which electromagnetic means is provided for holding the movable armature in a position from it would normally move as a result of the reduction in magnetic flux by movement of the flux short-circuiting device.
Figure 4:
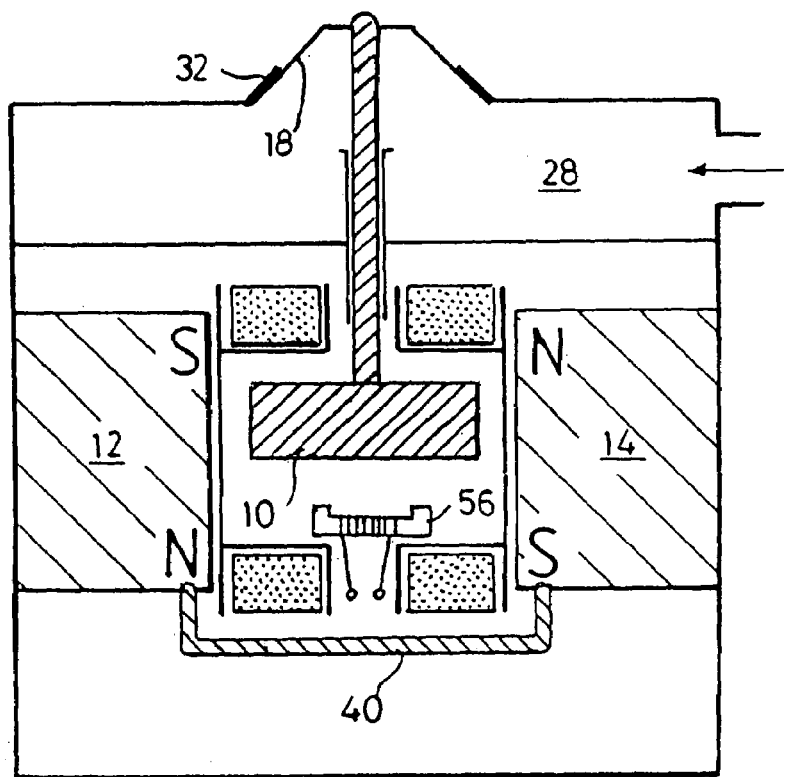
FIG. 4 illustrates the arrangement of FIG. 3 in which the electromagnetic holding device has been disabled allowing the armature to shift to the other end of the drive.

FIGS. 3 and 4 illustrate a modification to the FIG. 1 arrangement in which electromagnet 56 having a winding 58 is located at the lower end of the armature travel to engage the armature and provide a holding magnetic flux when the armature 10 is in its lowermost position as shown in FIG. 3.

The holding flux will only exist whilst a current flows in the winding 58, and to this end a current source exists to supply an appropriate current in the winding 58. If the latter is made up of a large number of turns of thin wire, only a very small current is needed to generate sufficient flux to hold the armature 10 against the pole pieces of the solenoid 56 and provided no air gap is introduced between the pole pieces and the armature 10, the closed path provided for the magnetic flux will hold the armature in the lower position as shown in FIG. 3.

In the event that the current flowing through winding 58 falls to a low value or collapses completely, the holding flux will also collapse and if a flux gradient exists in the region between the two magnets 12 and 14, the armature will move to the position of maximum flux density.

This movement is demonstrated in FIG. 4 in which the current in the solenoid winding 58 has been reduced to zero thereby enabling the armature to move to the upper end of the region of its travel where the flux density between the two magnets 12 and 14 is maximum.

The flux gradient will only exist in the event that the flux concentrator or short circuiting device 40 is located in contact with the lower ends of the magnets 12 and 14 as shown in FIGS. 3 and 4. The provision of this flux concentrating/short circuit device as a permanent or semi-permanent part of the assembly is an essential ingredient if the device is to be a monostable device having a home position in which the armature is at the upper end of its travel and a latched position where the armature is held at the lower end by virtue of a small current flowing in the coil 58.

Transition between the home position and the latched position is effected in the manner described in relation to FIG. 1 by means of a pulse of current of appropriate polarity flowing in the windings 36 and 38 so as to reinforce the field which is otherwise reduced by the effect of the short circuiting device 40 to cause the armature to move towards the solenoid 58. Once in contact therewith, the low current flowing in the solenoid winding 58 will maintain the armature in its lower position and the device is fail-safe in that if the current in the winding 58 collapses or simply reduces considerably, the armature will be free to move back up the flux gradient to the stable home position.

In each case the stable home position corresponds to the valve closure member 18 being firmly positioned against the valve seat 32 thereby closing off the exit from the chamber 28.

Figure 5:
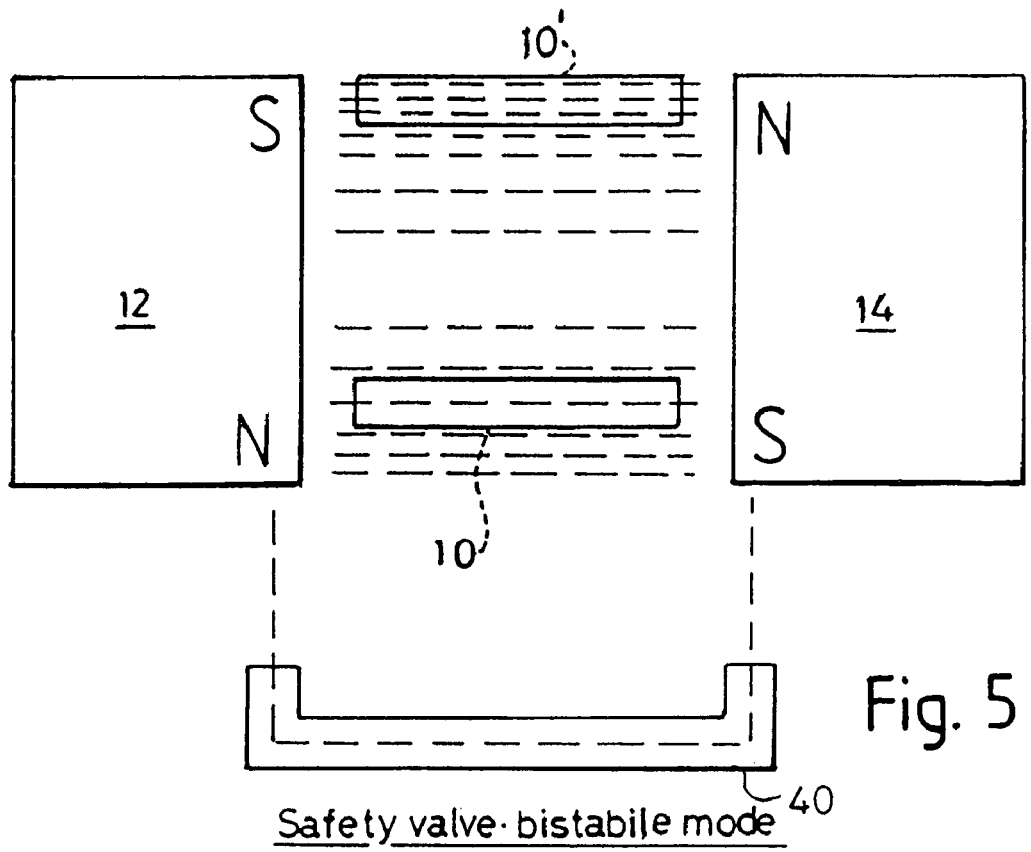
FIG. 5 shows the magnetic flux pattern of two magnets without a flux short circuiting device bridging one end of the magnets.
Figure 6:
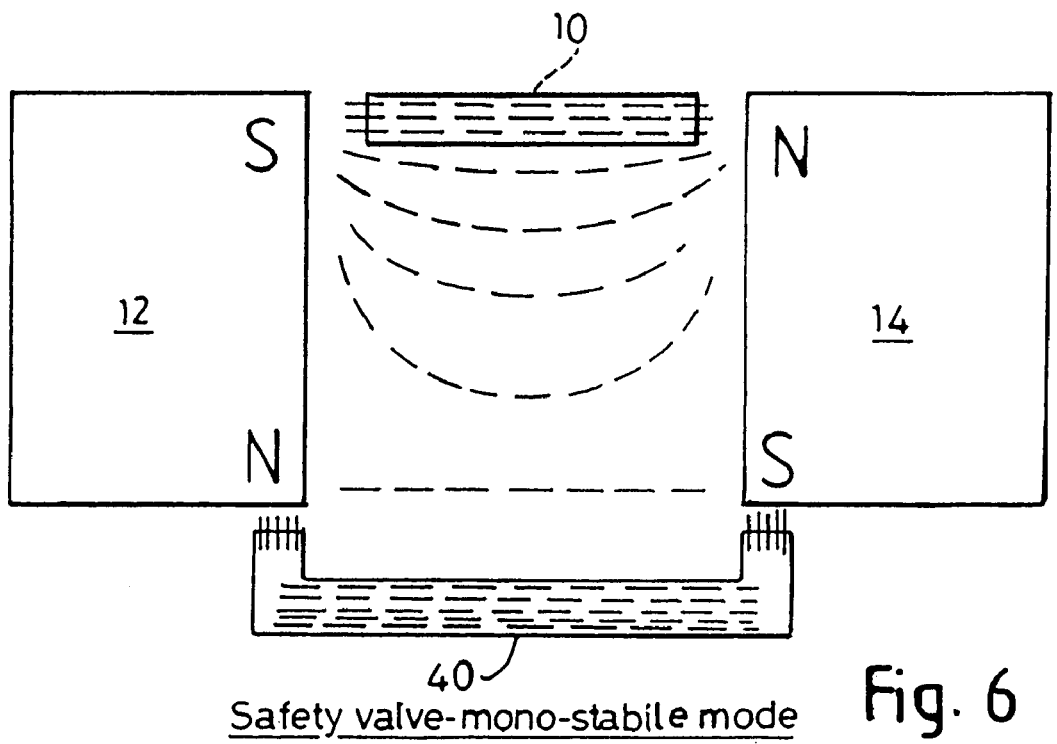
FIG. 6 shows the effect of short circuiting the flux at one end of the magnet assembly, thereby creating only one stable position for a magnetisable armature located between the two magnets.

FIGS. 5 and 6 show the flux lines between the magnets 12 and 14 with the short circuiting magnetisable concentrate 40 displaced from the assembly in FIG. 5 and close to if not in contact with the assembly as shown in FIG. 6.

Figure 7:
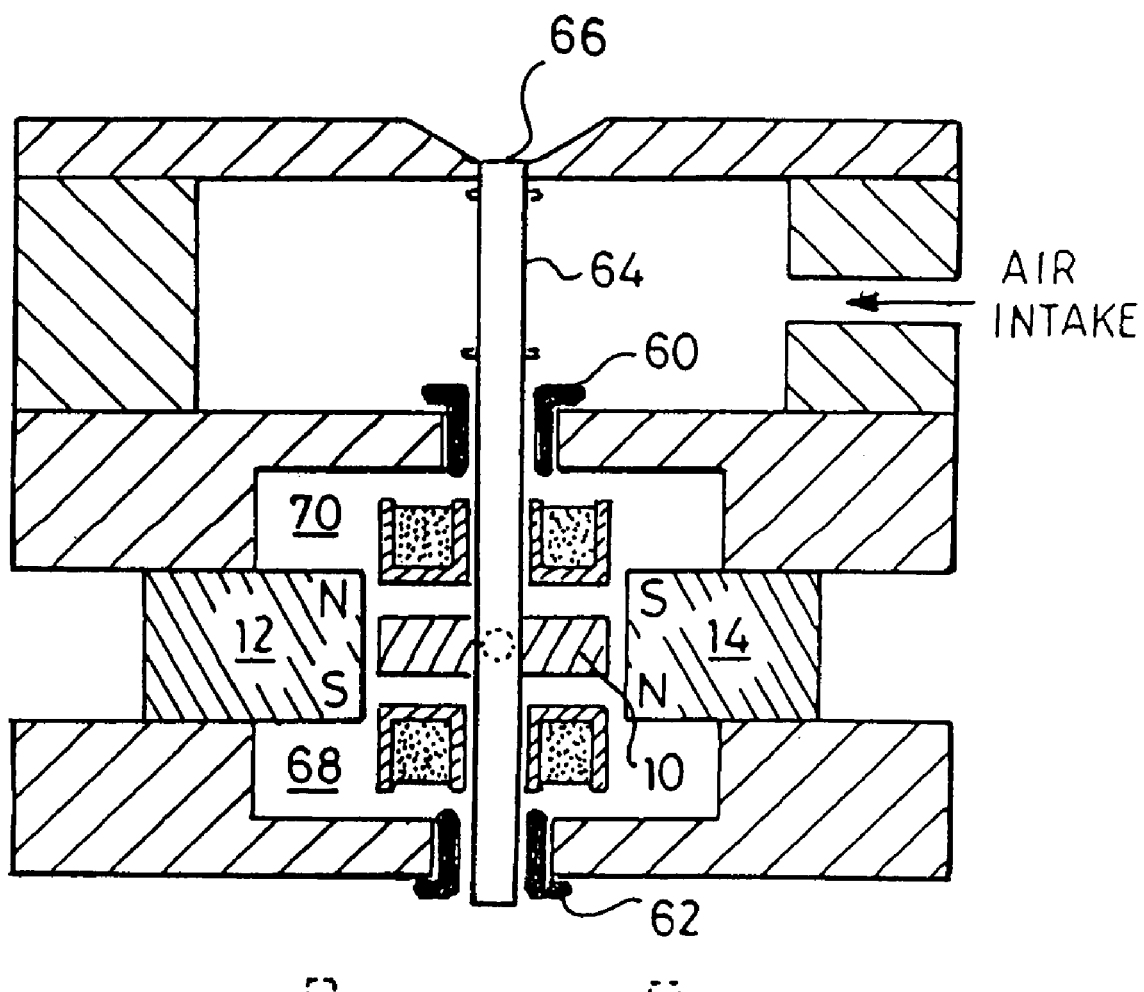
FIG. 7 is a schematic diagram of a drive for a fluid control valve, in which the device is a balanced magnetic drive having two stable equilibrium positions.
Figure 7:
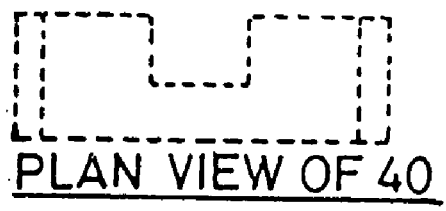

FIG. 7 shows the essential parts of a bi-stable valve constructed essentially as shown in FIG. 1, with seals 60 and 62 between the hollow rod 64 which terminates in the upper end with a valve closure device 66. A concentrator 40 may be located in the chamber 68 if desired so as to concentrate the flux into itself between the lower poles of the two magnets 12 and 14 as previously described to convert the device into a monostable valve. It will be seen that the concentrator 40 could be inverted and located in the other chamber 70 at the upper end of the assembly so as to reverse the flux gradient but in this event the device would not close in the event of power failure.

For the monostable operation to be successful, an additional electromagnetic device is necessary as described with reference to FIGS. 3 and 4 to hold the armature at the unstable end of its travel.

Figure 8:
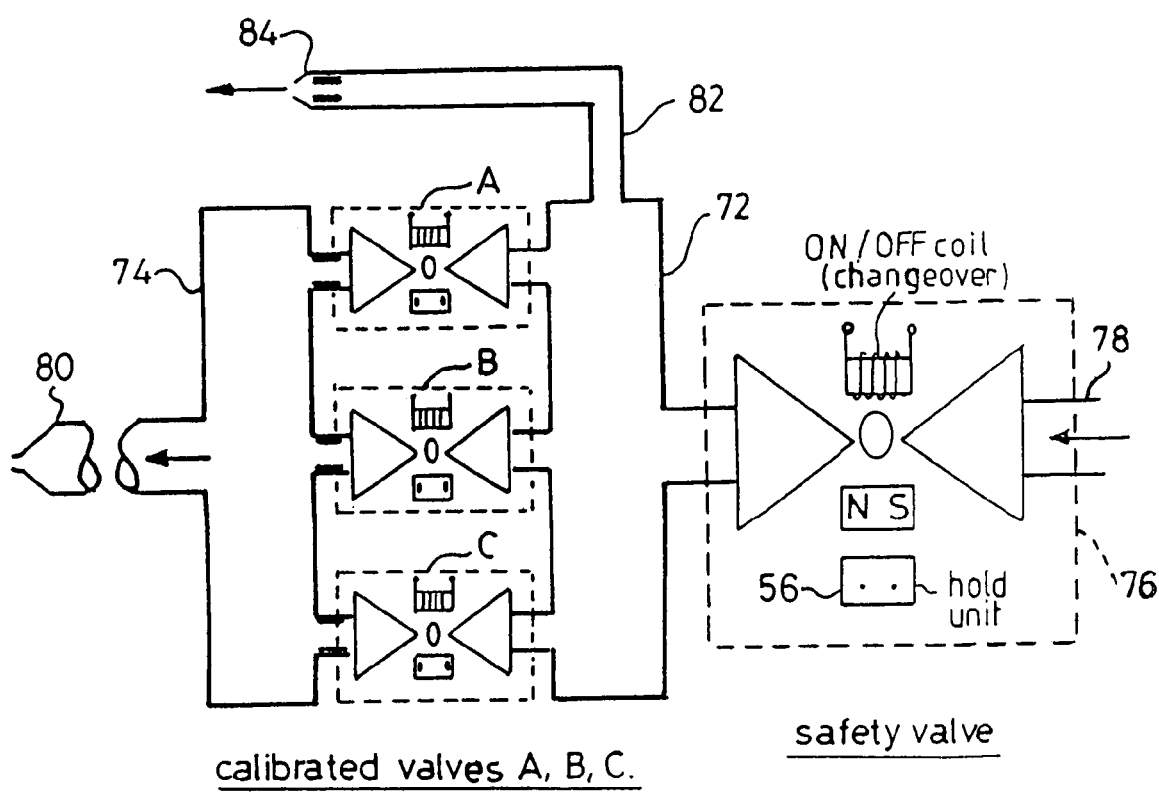
FIG. 8 illustrates how a number of such valves can be arranged to provide digital control of gas flow, in series with a monostable fail-safe valve.

FIG. 8 shows how three valves each having a different sized orifice can be arranged in parallel to provide digital control having eight discrete flow rates depending on which of the valves is open between a first chamber 72 and a second chamber 74. Each of the valves is operated by a drive similar to that shown in FIG. 7 and fluid is supplied to chamber 72 via a monostable fail-safe valve such as is described in relation to FIGS. 3 and 4.

This valve is denoted by reference numeral 76.

The inlet to valve 76 may be gas pipe 78 supplying gas at moderate pressure for burning in a gas burner jet 80 which is supplied with gas from the second chamber 74. Depending on which of the valves A, B and C are opened, so the flow of gas to the burner 80 will be zero or maximum or any one of six different levels in between.

A small bleed pipe 82 feeds a pilot jet 84 from the chamber 72 and a bi-metal strip or other temperature sensitive device is located in the pilot flame to provide a holding current for the holding solenoid such as 56, 58 of FIGS. 3 and 4 as employed in the valve 76.

In the event of flame failure at the pilot light, the current in the holding device collapses and valve 76 closes.

As a safety measure, circuit means may be provided sensing the current in the holding device for valve 76 such that if this current fails, a current pulse is supplied to each of valves A, B and C to close each of these valves off.

The features of the device are set out in the list of features in the lower part of FIG. 8.

As observed on the drawing, any number of valves such as A, B, C may be employed, the more that are employed, the greater the number of possible intermediate steps which can be provided between the fully open gas flow mode and the fully closed gas flow mode of the valves.

A simple digital gas flow control valve can therefore be made which contains no moving parts and can be arranged to fail safe in the event of power failure.

Figure 9:
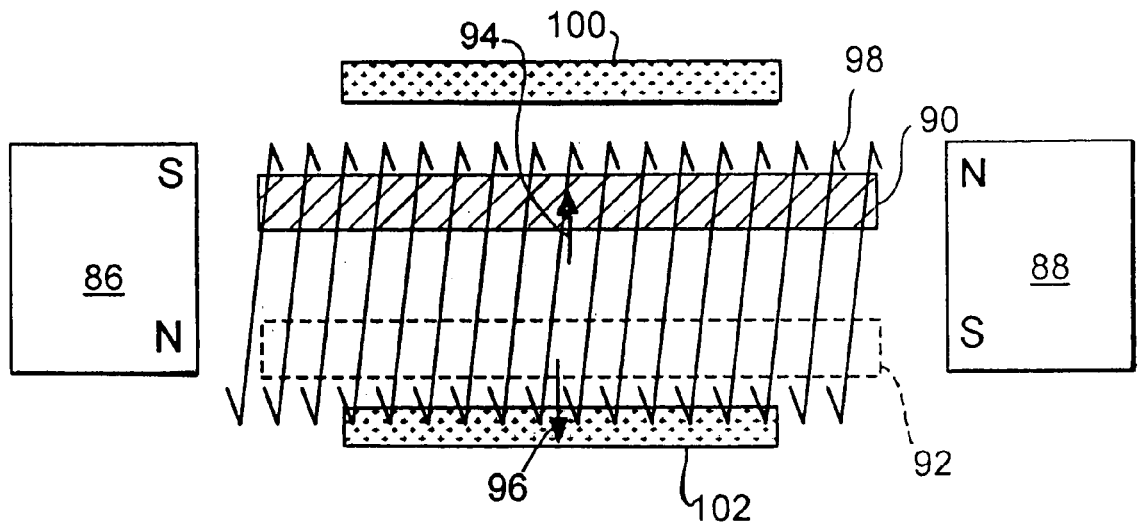
FIG. 9 is a diagrammatic illustration of a bistable magnetic drive, which incorporates two magnets.

FIG. 9 illustrates a magnetic drive formed from two permanent magnets 86 and 88, and elongate armature 90 which can either rest in the upper position as shown or in the lower position shown in dotted outline at 92. The two positions of the armature coincide with the regions of maximum flux density in the complex field between the two magnets.

It will be appreciated that approximately half way between the two positions 90 and 92, the flux density will be effectively zero and will increase sharply in the directions of arrows 94 and 96. Beyond the positions 90 and 92, the flux density will tend to fall away.

The two positions 90 and 92 are therefore positions of equilibrium, albeit relatively unstable equilibrium in that if the armature is in one position, and is moved towards the other position by external means, there will become a point in time in which the influence of the magnetic flux associated with the other position will exceed that of the field from which the armature is moving and the latter will be attracted into the said other position.

Movement of the armature can be effected magnetically by locating an electromagnetic winding 98 between the two magnets 86 and 88. Passing a current through the winding in one sense will increase the magnetic flux density in the upper field and reduce the flux density in the lower field thereby shifting the position of zero flux density towards the lower field if not into and beyond the lower field depending on the flux density produced by the electrical magnet. Reversing the direction of current flow will reverse the effect on the flux in the upper and lower fields and shift the position of zero flux to the region of the upper field if not beyond it.

The net effect is to create a flux gradient extending from one armature position to the other depending on the direction of the current flow in the electromagnet 98 and the armature will always tend towards the region of higher flux density.

Once the armature has been moved from one field position to the other field position, current is no longer required to flow in the electromagnet to maintain the armature in the new position since on the collapse of the current, the flux pattern between the two magnets will be restored and the position of zero flux will again be located approximately midway between the armature positions causing the armature to remain in the position into which it has been moved.

The flux produced by the electromagnet 98 can be significantly enhanced by locating magnetic concentrators 100 and 102 externally of the electromagnet coil 98 to provide a lower reluctance path outside the coil thereby effectively matching the low reluctance path within the coil (caused by the presence of the armature) and thereby increasing the flux available within the electromagnet to influence the magnetic fields between the two magnets 86 and 88.

The external concentrators 100 and 102 also attract flux from the permanent magnets 86 and 88 and by virtue of the magnetisation of the armature and the concentrators 100 and 102 by the permanent magnet fields and the flux generated by the flow of current in the electromagnet 98, the flux gradient from one end of the armature travel to the other is significantly enhanced, thereby improving the changeover characteristic of the drive for a given flow of current in the electromagnet 98.

Figure 10:
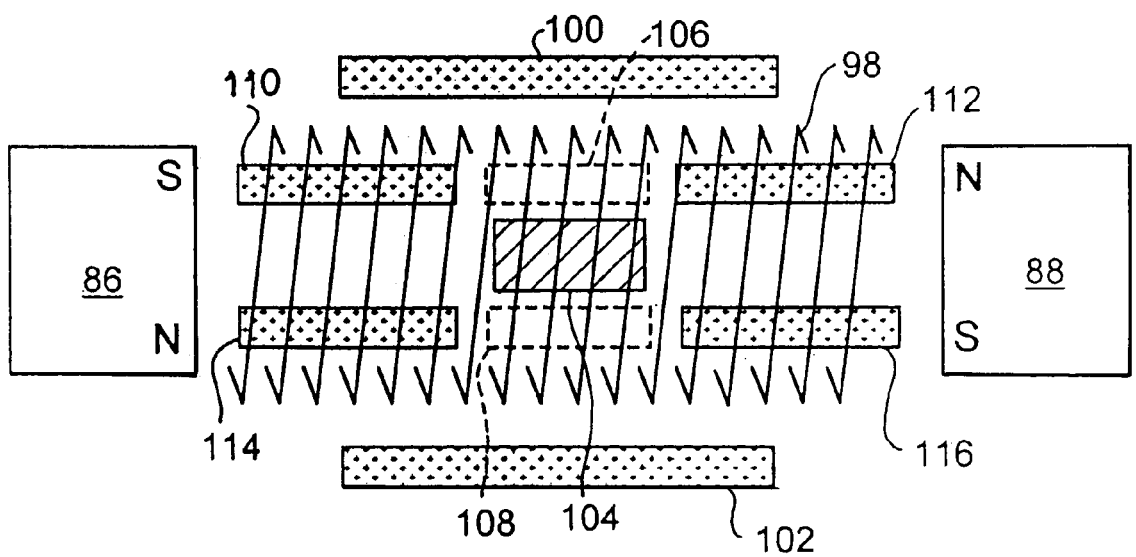
FIG. 10 is a similar illustration of a two-magnet bistable magnetic drive constructed in a similar way to that shown in FIG. 9.

FIG. 10 illustrates a further refinement of the arrangement shown in FIG. 9 in which the armature 90 is now replaced by a shorter element 104 which as shown is in its midway position between the two ends of its travel denoted by the rectangular dotted outlines 106 and 108. The magnetic flux from the magnets 86 and 88 is concentrated into upper and lower air gaps at opposite ends of the armature travel by means of two pairs of pole pieces 110 and 112, and 114 and 116. In the same way as is shown in, and described with reference to, FIG. 9, elongate concentrators 100 and 102 are also provided externally of the switching coil/electromagnet 98.

The device operates in exactly the same way as described in relation to FIG. 9, except that the armature is now less massive and requires effectively less energy to shift it from position 106 to 108 and vice versa. This means that the flux required to be generated by the electromagnet 98 can be reduced or for a given electromagnet and current, the force acting on the armature is considerably greater than would otherwise be the case leading to a more reliable operation of the drive or enabling greater force to be exerted from the armature to an external element which is driven by the armature.

Pole pieces 110 to 116 serve to concentrate flux in the two fields between the two permanent magnets into the upper and lower central air gaps and serve to better define the position of zero flux midway between those two air gaps in the non-energised condition of the coil 98.

The external flux concentrators 100 and 102 serve to enhance the flux available on energisation of the electromagnet coil 98 as previously described.

Either of the arrangements shown in FIGS. 9 and 10 can be adapted to form an electrical switch by providing electrical contact adjacent one or both of the positions of the armature and by forming the armature from electrically conductive material or mounting on or coating on the armature electrically conductive material which completes an electrical circuit between the contacts when the armature occupies the position adjacent the contacts.

Contacts may be provided at both ends of the armature travel so that two different electrical circuits are made depending on whether the armature is at one end or the other of its travel.

Figure 11:
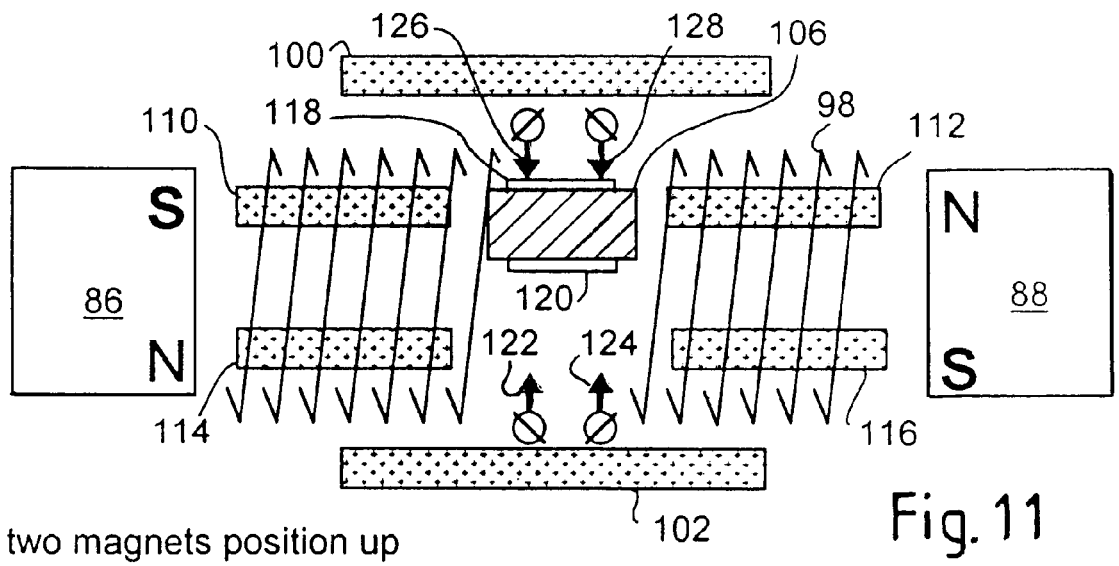
FIGS. 11 and 12 are similar views of the drive shown in FIG. 10, showing the armature in its two bistable positions wherein the armature short-circuits pairs of electrical contacts at opposite ends of its travel and converts the drive into a relay.
Figure 12:
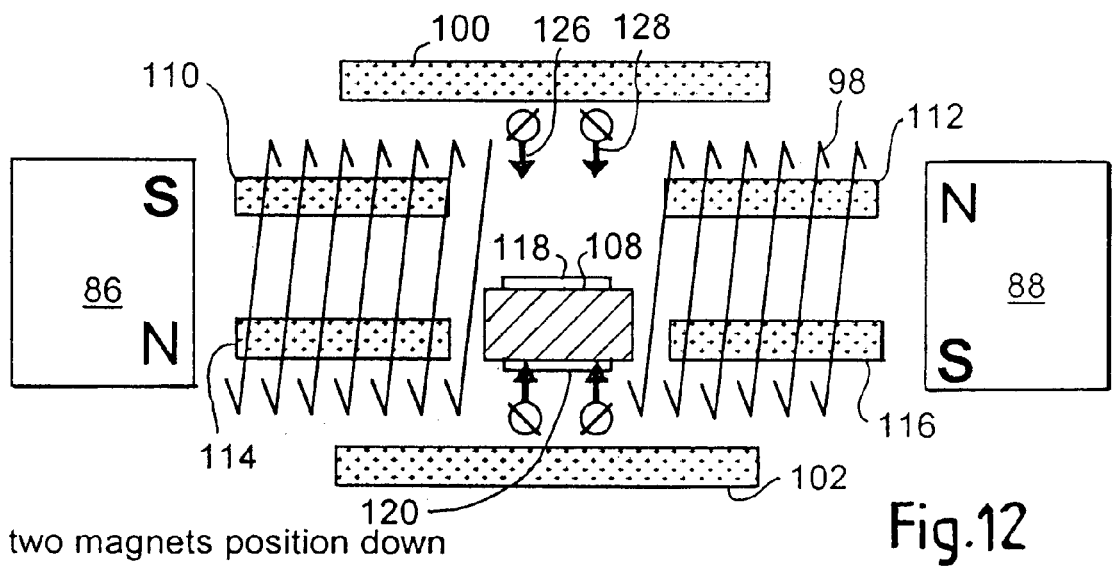

FIGS. 11 and 12 illustrate the FIG. 10 arrangement in which the armature 104 has conductive elements 118 and 120 located on opposite faces for making contact with a first pair of contacts 122, 124 at the lower end of its travel and a second pair of contacts 126, 128 at the upper end of its travel.

The armature 104 is shown in its upper position in FIG. 11 and in its lower position in FIG. 12.

Figure 13:
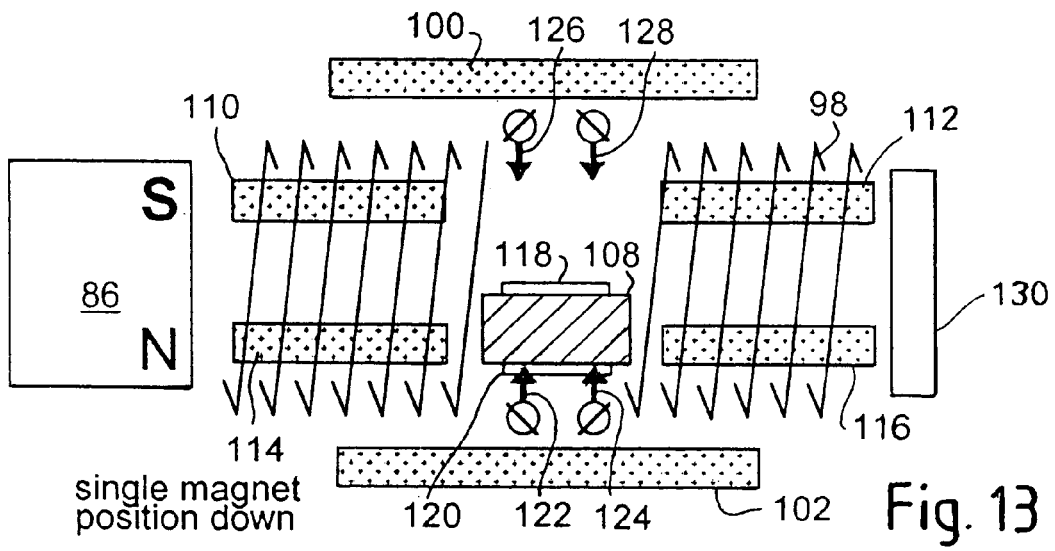
FIG. 13 is a similar view of another bistable drive, in which only a single element magnet is required, and wherein the armature is again shown cooperating with pairs of contact to perform the function of a relay.

It is to be understood that two permanent magnets such as 86 and 88 are not required and a drive can be constructed from single magnet such as 86 and a flux return member 130 as shown in FIG. 13. This comprises the arrangement of FIG. 12 in which the magnet 88 is replaced by the flux returning member 130. With no current flowing in coil 98, the flux from permanent magnet 86 will induce North and South poles as shown in the various magnetisable elements making up the circuit and armature 120 will remain in the lower position as shown.

Introducing a current of sufficient magnitude into the coil 98 will enhance the flux density between the upper pole pieces 110 and 112 and reduce if not eliminate flux between the pole pieces 114 and 116 causing the armature 120 to shift from the lower position shown to the upper position such as is designated in FIG. 11.

It will be seen that the second magnet 88 serves no purpose other than to reinforce the flux density in the air gaps between the pole pieces at opposite ends of the armature travel, and by providing a low reluctance path as by an elongate magnetisable member 130 in place of the second magnet 88, the flux pattern within and operation of the drive remains unchanged.

Although an arrangement incorporating a single magnet is shown in conjunction with an armature having conductive 118 and 120 for cooperating with contacts as described in relation to FIGS. 11 and 12, it is to be understood that the single magnet drive is applicable to any arrangement including monostable arrangements as described herein.

Figure 14:
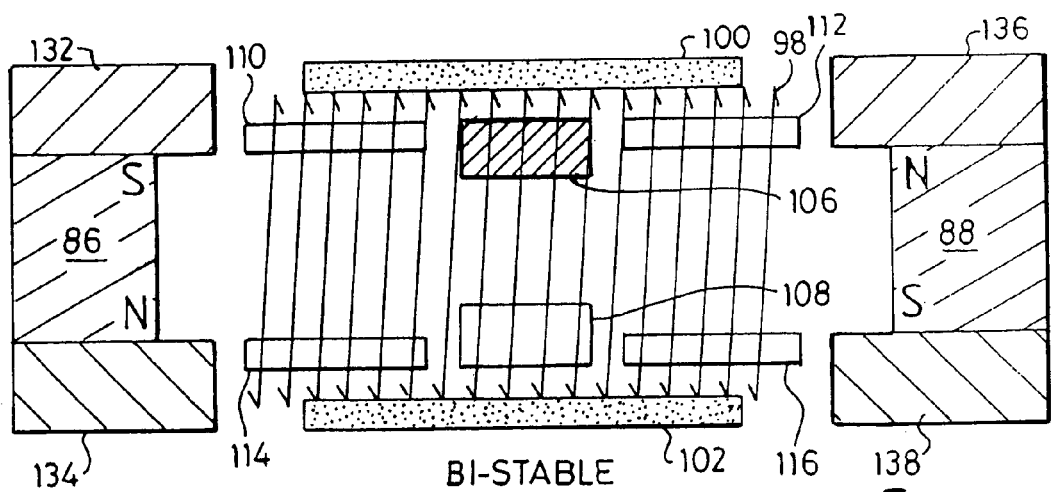
FIG. 14 is a further bistable drive constructed so as to more precisely route the magnetic flux available from the permanent magnets.
Figure 15:
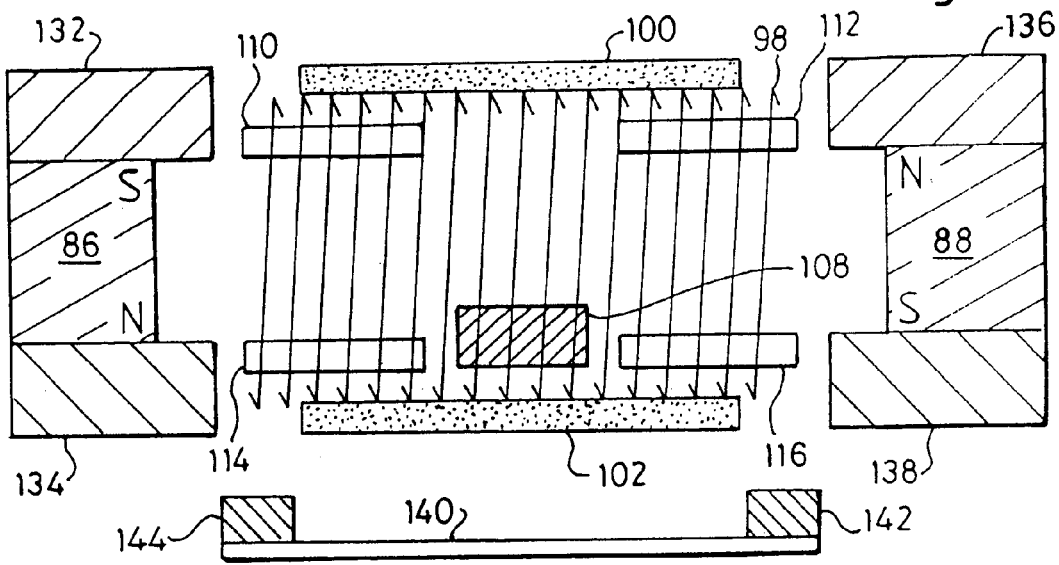
FIG. 15 is a modification of the FIG. 14 arrangement in that a flux concentrator is provided which if moved close enough to the balanced magnetic circuit, will introduce imbalance in the flux pattern so as to introduce optionally (for example in a power failure mode) monostability into the operating characteristics of the device.
Figure 16:
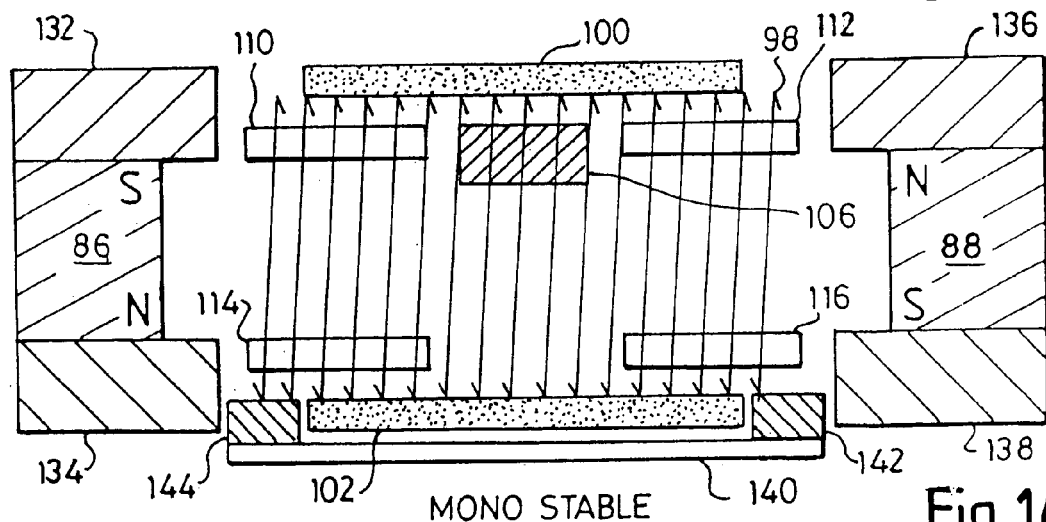
FIG. 16 is a further modification of the FIG. 14 arrangement in which the flux concentrator is located permanently in a flux imbalancing position, to create a monostable drive device.

Since the flux emanating from the magnets 86 and 88 will tend to issue from the end faces of the magnets, a practical arrangement preferably includes pole pieces at the ends of the magnets (or in the case of a single magnet arrangement, at the end of the magnet 86 and at the end of the flux returning device 130) which extend laterally towards the armature and pole piece assembly within the electromagnet as shown in FIGS. 14, 15 and 16.

For simplicity a two magnet drive is shown based on the FIG. 11 arrangement and the armature shown at 104 is in its upper rest position at one end of its travel. An outline position at 105 denotes the other stable position for the armature. Similar reference numerals have been incorporated in these Figures as have been used in FIGS. 10, 11 and 12 to denote the same or similar items.

In accordance with this aspect of the invention, laterally extending pole pieces 132 and 134 are provided at the opposite ends of the magnet 86 and similar pole pieces 136 and 138 are provided at opposite ends of the other magnet 88. The pole pieces provide a low reluctance path for flux linking the magnets 86 and 88 with the other magnetisable members of the magnetic drive and this increases the flux density available to the drive from any given pair of magnets 86 and 88 (or single magnet 86).

The arrangement shown in FIG. 14 is a bistable arrangement since it is wholly symmetrical and the armature will remain in either the upper position at 106 or the lower position 108 as described in relation to FIG. 10, until triggered to move from one position to the other by an appropriate current flow in the electromagnetic coil 98.

The arrangement shown in FIG. 15 is a bistable drive which can be modified in an emergency to adopt a monostable characteristic by introduction of an external flux concentrating element 140 having pole pieces 142 and 144 which can be introduced between the pole pieces 134 and 138 and the external flux concentrating element 102 so as to significantly concentrate most of the flux which would otherwise link the armature (if in position 108 as shown), and lower pole pieces 114 and 116, whilst leaving the flux linking the other pole pieces 110 and 112 virtually unchanged. The flux gradient so produced will accelerate the armature 108 into the upper position 106 shown in FIG. 14 and the armature will tend to remain in that position all the time element 140 is located with its pole pieces 142 and 144 between the two magnets.

Passing an appropriate current through the electromagnetic coil 98 can overcome the flux short-circuiting effect of the element 140 to enable the armature 108 to be moved to the lower position while the current flows, but it will be seen that as soon as the current fails, the armature 108 will revert to the upper position for the reasons indicated above.

FIG. 16 shows the element 140 located in its proximate position between the poles 134 and 138, and demonstrates how the armature will normally adopt the upper position 106 when the element 140 is so positioned.

FIG. 17 shows a manifold 150 having an air inlet 152, an upper flat wall 154 and lower parallel wall 156 and a plurality of orifices 158, 160, 162, through which air can escape if open, but which can be closed by closure members 164, 166, 168 respectively if the latter are moved into their upper position (as shown for 158 and 162 respectively). Sealing (not shown) is provided between the closure members and the corresponding openings 170, 172 and 174 through which the lower ends of the closure members 164, 166, 168 can protrude (as does 166), when they are in their lowered position.

Similar sealing (not shown) is provided between the upper ends of the closures 164, 166 etc and the openings 158, 160 etc.

Each closure 164, 166 etc includes an integral magnetic armature 176, 178, 180 respectively, and the rest of the closure comprises a lightweight hollow tube of plastics material, or the like.

Each closure is movable into one or the other of its two stable positions by causing a short pulse of electric current of appropriate polarity to flow in windings such as 182, 184, around magnet poles such as 186, 188, and 190, 192 forming a magnetic drive device, and one such device is provided for each of the closures.

A plan view of the arrangement of FIG. 17 (with uper wall 154 removed) is shown in FIG. 18, and the line AA shows the section line used for producing FIG. 17.

A perspective view of the arrangement is shown in FIG. 19 in which the array of orifices 158, 160, 162 in the top surface 154 are denoted by reference numeral 194, and a rectilinear block of material 196 is shown located on the surface 154.

Air escaping from orifices in the array 194, below the object 196, creates a cushion of air which will elevate the block 196, and create an air bearing, permitting block 196 to be moved freely and without significant friction force, or contact with the surface 154.

The opening and closing of the orifices 154 is controlled by signals from light sensors (such as photodiodes) located in a similar matrix array between the orifices 194. One of these sensors is identified by reference numeral 198 and another by 200. A light source 202 above the surface 154 will normally illuminate all the sensors, and the signal produced by the sensors in that event is arranged to shift all the closures (such as 164) into their upper positions, to close off their respective orifices 158, 160 etc.

If an object such as block 196 is located over some of these sensors, as shown, light is inhibited from reaching those sensors, and the signals from these sensors are decoded and used to shift the closures of the orifices associated with the sensors in the group, into their lower positions. This opens the related orifices and permits air to escape below the block, and create an air cushion to lift the block out of contact with the surface 154.

By interrogating the sensor output signals continuously, or repetitively at a high rate, any lateral movement of the block can be rapidly ascertained, and the relevant closures moved to close off exposed orifices and open any now below the block.

A computer based control device 204 receives signals from each of the sensors 198, 200 etc along separate data paths 206, 207 etc. Operating currents for (or signals to cause current to flow in) the coils (such as 182, 184) of selected magnetic drives linked to orifice closures (164) etc, are supplied to the drives along current paths/data paths 208, 209 etc.

FIG. 19(*b*) is a scrap section through the manifold 150, and shows the sensors (198, 200 etc), orifices (158, 160 etc) and closures (158, 160 etc).

Current/data paths (206, 207 and 208, 209 are exemplified by similar reference numerals as were employed in FIG. 19(*a*). One of the magnetic drives is described by reference numeral 210.

Figure 20:
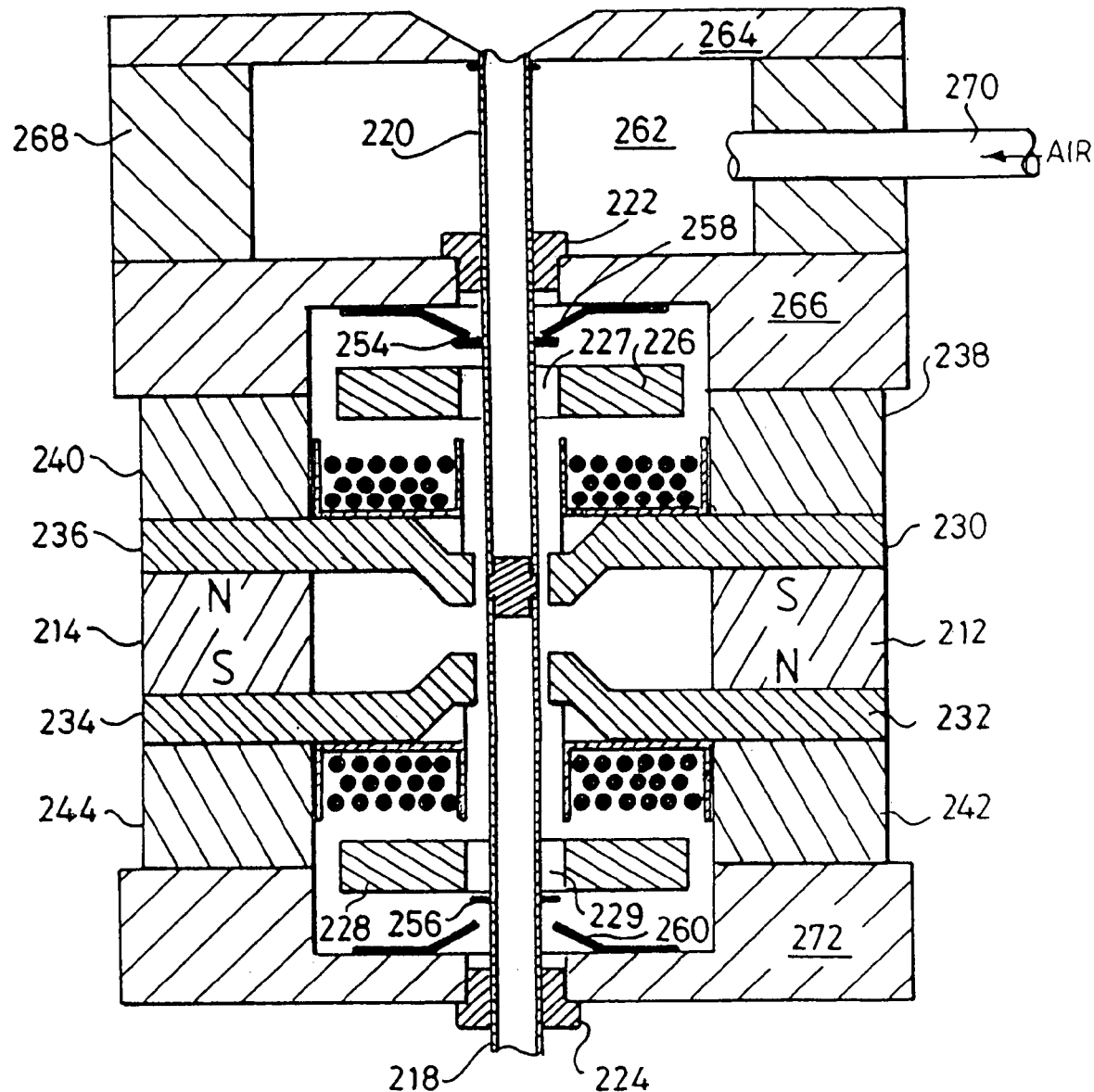
FIG. 20 illustrates a valve with a magnetic drive embodying the invention which includes springs at opposite ends of the armature travel.

FIG. 20 is a cross-section through a pneumatic valve assembly operated by a magnetic device embodying the invention. This comprises two permanent magnets 212, 214, an armature 216 and hollow light weight aligned tubular extensions 218, 220 thereto which are guided in sleeve seals 222, 224. External magnetic shunts are provided at 226, 228. These are apertured at 227 and 229 to permit the extensions 218, 220 to extend therethrough. Four internal polepieces are provided at 230, 232, 234 and 236. Four magnet extensions are provided at 238, 240, 242 and 244 and two electromagnet windings are located around the internal polepieces as denoted by 246, 248.

A ring seal 250 partially engaged in an annular groove (not shown) in the exterior of the tube 220 serves to fully close off the orifice 252 when the armature is in its upper position (not shown), by engagement with the lower rim of the orifice 252.

The armature extensions 218, 220 carry radial flanges at 254, 256 which can engage dished annular springs 258, 260 respectively. In accordance with the invention the positions of the flanges 254, 256 relative to the armature travel and the springs 258, 260, are selected so that the latter are just engaged and compressed as the armature reaches its upper and lower rest positions respectively, as determined by the magnet polepieces 232, 234 and 238, 240. As shown in FIG. 20 the spacing is also selected so that the armature cannot engage both springs at the same time A chamber 262 is shown at the upper end of the assembly having upper and lower walls 264, 266 and an encircling side wall 268 which extends coaxially around the tube 220. This wall includes an inlet orifice through which a gas supply pipe 270 extends to convey gas (eg air) under pressure to the chamber 262.

The assembly is completed by a baseplate 272 which supports the lower spring 260 and the sleeve seal 224.

Conductors for conveying energising current to the windings 246, 248 etc, are not shown.

Although only shown in FIG. 20, energy absorbing springs (only engaged as the armature in each drive reaches one or both ends of its travel) may be fitted to the drive shown in each of FIGS. 1 to 19.

Note.

In FIG. 21 onwards reference numerals are employed which also appear in earlier FIGS. 1 to 20 of the drawings. The items referred to by the same reference numerals in relation to FIG. 21 onwards are not to be confused with the items referred to in the earlier Figs by the same numerals.

Description of FIG. 21 Onwards.

In FIGS. 21 and 22 the component parts are identified as follows:—

| | |
|---|---|
| Permanent magnet | 1 |
| Rocking armature | 2 |
| Pole pieces | 3, 4 |
| Springs | 5, 6 |
| Spring holders | 7, 8 |
| Coil | 9 |
| Coil terminals | 9a |
| Coil bobbin | 10 |
| Rocking edges | 11, 12 |
| Inlet port | 13 |
| Outlet ports | 14, 15 |

The actuator of FIG. 21 represents a new type of pulse driven bistable device where movement of a ferromagnetic armature (2) is restricted to one plane by spring extensions (5, 6) anchored in two non-magnetic holders (7, 8) and by two rocking edges (11, 12) formed inside a bobbin (10). The armature will stay in one or the other of two stable positions determined by the poles A and D, or B and C. A permanent magnet (1) provides a static magnetic flux and a rocking movement is produced by altering the polarity of the armature and the balance between the magnetic flux linking the poles and the opposite ends of the armature.

This is achieved by coil (9) fitted around the armature (2) which creates a local magnetic field when a short pulse of electric current flows through the coil. In one direction this reinforces the flux so keeping the armature in its last position, (in contact with poles B and C as shown). The other direction of current flow reverses the magnetic polarity of the armature, and sufficiently reduces the flux linking the armature to the one set of poles (B and C as shown) to cause the armature to flip into its other stable position in contact with poles A and D.

The magnetic force of repulsion (from poles B and C) and attraction (towards poles A and D) is initially assisted by the spring force stored in 5 and 6. Movement is therefore very rapid since there is maximum force acting on the armature at the beginning of each rocking movement and in this way a very short actuator reaction time can be achieved.

As the armature moves through its mid position the spring force acting on the armature and hitherto accelerating the armature away from one set of poles towards the other set, reduces to zero and then reverses and acts to resist movement of the armature towards the other set of poles. This tends to decelerate the armature as it moves towards the other set of poles.

In this way the impact between armature and poles is reduced as the former flips from one position to the other.

By not anchoring one of the springs the free spring end can be used to move something external to the device as shown in FIG. 23.

For example the free end can be used to open and close a valve as shown in FIGS. 24 and 25. The balanced and well-defined magnetic and spring forces secure bi-stable operation. In this way both valve positions (opened and closed) are maintained by magnetic force rather than relying on spring force, and short reaction time, low energy (current) consumption and long life span is nevertheless obtained. There is a great variety of external devices which can be controlled by a device such as shown in FIG. 22. Examples are as follows:

Thus FIG. 24 shows the actuator of FIG. 23 operating a high pressure valve, which is self-sealing under pressure from a chamber (not shown) into which or from which fluid flows. This configuration can be used to control inlet and/or exhaust valves in an internal combustion engine, so obviating the need for a camshaft. The fluid flow denoted in FIG. 24 is illustrative of an inlet valve. The flow direction arrows would be reversed in the case of an exhaust valve In FIG. 25 the actuator of FIG. 23 is shown operating a dosing valve, which also self-seals under pressure from a supply source connected to the inlet. This configuration can be used to digitally control the supply of gases or liquids e.g. drinks dispensers, fuel cells, oxygen supply to a patient and many more.

The actuator of FIG. 23 can be used as an active flow mixer, flow direction controller, where for example two different fluids are to be mixed in a controllable manner e.g. in a direct digital jet engine noise control system or when an incoming fluid needs to be directed one way or another i.e. fuel supply modulation in gas turbines.

FIGS. 21 and 26 show how the armature itself can serve as a valve closing device by forming passages in the poles C and D which communicate with ports 14 and 15 in FIG. 21, and 16 and 17 in FIG. 26.

In the case of FIG. 21 a further port 13 serves as an inlet port and movement of the armature 2 connects the inlet port 13 either to port 14 (as shown) or in its other position (in contact with poles A and D) to port 15. In this case ports 14 and 15 constitute outlet ports and the valve is a diverter valve for conveying fluid from 13 either to outlet 14 or 15.

If port 15 in FIG. 21 (or 17 in FIG. 26) is blocked off, the valve becomes a simple ON/OFF fluid flow control valve which in one position allows fluid flow between ports 13 and 14 (as shown) (or 16 and 18 in FIG. 26) (or vice versa) and in the other position inhibits fluid flow therebetween.

In FIG. 26 the same reference numerals as employed in FIGS. 21 and 22 are used to denote the permanent magnet 1, and the magnetic pole-pieces 3 and 4 which protrude inwardly to define poles C and D. Each is formed with a through bore 16A and 17A respectively and all are housed in housing members 19 and 19A. The latter are formed from non-magnetic material and serve to enclose the actuator and valve.

A coil 9 wound on a bobbin 9A is located between the two pairs of poles A, B and C, D and surrounds the armature designated 20 in FIG. 26, where instead of being located by one or more leaf springs 5, 6 and rocking anvils 11, 12 as in FIGS. 21 and 23, the armature 20 is shown pivoted about a pin 22.

Seals 24, 26 surround the junctions between the pole pieces 3, 4 and housing members 19A, 19B to prevent loss of fluid from the ports and passages 16, 16A and 17, 17A.

Cylindrical passages 28, 30 in the pole pieces 3, 4 respectively serve to locate and house cylindrical inserts 32, 34 of magnetisable material, which protrude into the interior of the device to form magnetic poles A, B at one end of the armature, in a similar way as do the hollow protrusions of the pole-pieces forming magnetic poles C, D at the other end of the armature.

Within the hollow interiors of the pole inserts 32, 34 are located spring units 36, 38 respectively. Each unit comprises a thin walled cylindrical shell 40,(42) within which a compression spring 44,(46) is held captive between an end stop 48,(50) at the outboard end of the shell 40,(42) and a ball 52,(54) itself held captive within the shell at the inboard end thereof.

As shown in FIG. 26, when the armature is attracted towards pole A, the captive ball 54 in shell 42 protrudes beyond the end face of the pole insert 34 under the action of the spring 46, but is prevented from leaving the shell 42 by virtue of a necked region 43 at the inboard end of the shell 42 (best seen is the enlarged scrap section of FIG. 26A).

However when the armature 20 flips into its other position, it engages the ball 54 as it moves beyond its mid position and begins to compress the spring 46 through the ball, so disengaging the ball 54 from the neck 43 as it moves into closure with the inboard end of the insert 34 forming pole B.

Compressing the spring 46 converts some of the kinetic energy of the moving armature into potential (spring) energy which will remain stored in the spring while the armature remains in contact with pole B.

Of course the reverse applies to the spring 44 associated with insert 32 of pole A. With the armature 29 in the position shown in FIG. 26, energy is stored in the compressed spring 44 and as soon as the magnetic flux linking armature and poles creates magnetic attraction and repulsion forces to flip the armature 20 into its other position (in contact with poles B and C), the stored energy is available to accelerate the armature 20 away from pole A towards pole B.

As the armature leaves pole A, ball 52 is allowed to move under the action of the spring 44, into its fully protruding position (similar to that occupied by ball 54 in FIG. 26A), where it is retained by an annular neck 45 similar to 43 shown in FIG. 26A.

The annular necks 43, 45 may be continuous rings of material around the end of the shells 40, 42 or may comprise segments of annular rings in the form of claws similar to those employed to hold a precious stone in a ring.

Likewise the end stops 48, 50 at the other ends of the shells 40, 42 may be solid end walls or a necked region which will not permit the spring to leave the shell, a plurality of claws as aforesaid, or simply one or more bars extending across the open end of the shell.

To facilitate assembly the end stop 58,(50) may be formed after the ball and spring have been inserted into the shell.

Each magnetisable insert 32,(34) may be held in place by screw threaded engagement between it and its pole-piece 3,(4) or by an interference fit and/or by an annular shoulder 56,(58) between a larger diameter inboard end region forming the pole A,(B) and a smaller diameter section which extends through the passage 28,(30) in the pole-piece 3,(4). The outboard end may be flanged as by a metal pressing action during manufacture to form an annular flange 60,(62). As shown these are accommodated in annular cutaways in the outer faces of the pole-pieces 3, 4 to trap the smaller diameter section of the insert 32,(34) between inner and outer faces of the respective pole-piece 3,(4).

As with the necked regions 43, 45 the flanges 60, 62 need not be continuous but may comprise a plurality of radially formed fingers which to facilitate insertion of the insert into the passage 28,(30) are internally formed as axially extending castellations around the end of the insert, but can be forced during manufacture into the annular cutaway in the outer face of the pole-piece 3,(4) into which the insert has been pushed.

The balls 52, 54 are shown as spherical and the distance by which they protrude toward the armature 20 is governed at least in part by the diameter of the opening in the necked end 43,(45) of the shell 40,(42) and the position of that necked end relative to the end face of the pole A,(B).

If the balls 52, 54 are to protrude to a greater axial extent than is obtainable by using spherical balls, they can be replaced by non-spherical balls which may be egg-shaped or even cylindrical with a region of reduced diameter adapted to protrude through the necked opening 45,(43) and a larger diameter region held captive between the end of the spring 44,(46) and the neck 45,(43) respectively. Alternatively the balls may be replaced by conical or more preferably frusto-conical members, the larger diameter ends of which cannot pass through the necked regions 45,(43) respectively.

The magnitude and duration of the acceleration (or deceleration) forces acting on the armature due to the release (or storage) of spring force is adjustable by selecting the springs according to the desired spring rate required, and the distance by which the balls 52, 54 (or other devices) protrude beyond the end faces of the poles A, B. in this way the free travel of the armature when it is not in contact with either of the balls 52 and 54 (or other devices) can be adjusted.

Fine adjustment may be provided for by tapping the bores 28, 30 and forming a complementary screw thread profile on the outer surfaces of the shells 40, 42 and screwing the shells more or less into the bores. To this end the housing members 19, 19A may be formed with similar bores 28A, 30A (which need not be tapped) through which the shells 40, 42 can be passed to engage in the tapped bores 28, 30 and the outer ends of the shells 40, 42 are conveniently formed with screwdriver slots or other rotational drive engaging means to allow them to be screwed into the desired position in the pole inserts 32, 34.

Although necked regions 43, 45 may be provided in the ends of the shells 40, 42 respectively, the necking may instead be provided by radially protruding fingers or a radially protruding annular rim in the end of the bores 28,(30) in the pole inserts 32,(34) respectively.

The removal of the shells, springs and balls through the bores 28A, 30A, enables the springs and balls (or other armature engaging devices between the springs and armature) to be replaced when worn, or replaced on a planned maintenance basis. However appropriate selection of materials for the balls (or other devices) and the armature, or by coating the latter (at least where it impacts the balls or other devices) with a suitable wear resistant material, in combination with the soft landings created by the spring force decelerating the armature as it approaches closure with one pole or the other, has been found to extend the life of the device almost indefinitely.

A push rod is shown in dotted outline at 47 extending through port 17 and passage 17A for communicating movement of the armature externally of the device.

Actuators constructed substantially as shown in the drawings have achieved over three billion complete cycles (i.e. six billion movements) without any perceived wear and without interruption. This success is attributed to the soft landings of the armature on the respective poles due to the conversion of kinetic energy into potential energy as the armature moves through and beyond its mid-position and the spring effect that has been accelerating the armature away from one pole towards the other through its mid-position, reverses and begins to decelerate the armature as it leaves the mid-position and starts to move towards the other pole.

By careful selection of magnetic force and spring force, so the arrival of the armature on each pole at the end of its travel from one to the other can be virtually without impact.

Furthermore, by careful selection of spring material so that the distortion of the resilinet material providing the spring force is well within its elastic limits, the material, is not unduly stressed in operation so that fatigue will not be a factor in the life of the resilient material forming the spring.

In FIGS. 27 and 28 an armature generally designated 100 is mounted within a housing generally designated 102 to rock about a fulcrum 104, like a see-saw, between two home positions. The armature 100 is shown in one of its two home positions in FIG. 27 and in that position a curved underside central region 106 of the armature completely covers an opening in a valve seating surface 108 leading to a port C, leaving a similar opening on the other side of the fulcrum 104 exposed. This other opening leads to a port B.

The housing 102 is closed so as to form a fluid tight chamber 110, to which fluid can be supplied (or from which it can be removed) via an opening 111 in the wall thereof, which leads to a port A.

In the other home position, the armature 100 uncovers the opening leading to port C and closes off the opening leading to port B.

Depending on which home position is occupied by the armature, so fluid can flow between A and B, or A and C, or vice versa.

The armature is comprised of two permanent magnets 112, 114 sandwiched between three pieces of ferromagnetic material which form a central bridge 116, and two ends 118, 120 beyond the magnets.

The housing is comprised of upper and lower elongate ferromagnetic members 122, 124 between which is sandwiched at one end a coil 126 having a ferromagnetic core 128 and non-magnetic (typically plastics) bobbin 130.

At its other end the members are joined by an end closure 132 of non-magnetic material, and between the coil and end closure each of the members 122, 124 is formed internally with two similar protrusions, forming two pairs of magnetic poles 134, 136 on one side, and 138, 140 on the other side, of the fulcrum 104.

In its home positions the armature engages one from each of the two pairs of poles, i.e. 134 and 140 (as shown) or 136 and 138 in its other home position.

In order to obtain good face to face contact, the armature ends 118, 120 are tapered (as shown in FIG. 27). Alternatively the internal ends of the poles 134, 136, 138 and 140 may be inclined to allow parallel faced ends 118, 120 to fit face to face therewith.

The upper and lower members 122, 124 are cut away internally between the poles 134, 138 and 136, 140 to provide two rectilinear recesses into which two blocks of non-magnetic material 142, 144 are located and secured, as by an adhesive or by rivets or bolts (not shown). The poles 134–140 protrude internally beyond the internal faces of the blocks 142, 144 so that the latter do not interfere with the rocking of the armature from one set of poles to the other. In fact a clear space exists at all times between 142 and the armature. Below the armature the internal face of block 144 is dished to form the curved surface 108. Centrally of the surface is a wear resistant pin 146 (see FIG. 31) which protrudes above the surface 108 to provide a fulcrum about which the armature 100 can rock.

Also visible in FIG. 31 are passages 148, 150 leading from the ports B and C to the openings in the valve seating 108, denoted by 152 and 154 respectively in FIG. 31.

The armature 100 comprises a valve closure in that its movement into its two home positions closes either 152 or 154. In order to provide a rolling action to achieve closure, the central underside of the armature is formed with a curved underside 156 (see both FIGS. 27 and 31) having a central cavity 158 in which the head of the pin 146 is received.

Where the pin 146 is circular in cross-section and has a domed upper end, the cavity is preferably conical or frusto-conical.

Where the pin 146 is rectangular in cross-section, and forms a semi-cylindrical or triangular profile ridge about which the underside 156 rocks, the cavity 158 should be a triangular section groove for accommodating the curved or triangular section of the ridge.

The curved underside 156 may be an integral formation at the lower end of the central bridge section 116 of the armature, but more conveniently comprises a separate non-magnetic element 160 which is secured to the underside of the bridge section 116 in any convenient manner, and is preferably constructed from hard wearing material which may be similar to that from which the fulcrum pin 146 is constructed, Typically 146 and 160 are constructed form a Nylon® or similar plastics material.

In theory rocking can be achieved even if the two surfaces have the same radius of curvature but it has been found preferable for the radius of curvature of the curved surface 156 to be less than that of the curved surface 108. This is clearly shown in FIG. 31.

In order to ensure a good closing action as the curved surface 156 moves to cover openings 152 or 154, it has been found advantageous for the surface 156 to be part spherical (rather than cylindrical) and for the curved surface 108 to present a part cylindrical surface to the curved underside 156 of element 160.

Although the block 144 is preferably non-magnetic, it may still be formed from a material whose surface hardness is greater than the surface hardness of the material forming element 160. Thus block 144 (or at least the surface 108 thereof) may be formed from a non-magnetic metal and element 160 (or at least the surface 156) from a plastics material which can be considered to be resiliently deformable in relation to a metal. By employing such a combination of materials, the underside surface 156 of element 160 can if necessary deform slightly to ensure a good seal around the opening 152 or 154 as the armature rocks into contact with one set of poles or the other, thereby ensuring a reliable closure of the opening 152 or 154 leading to port B or C.

As shown the valve will direct fluid flow from A to B or to C, (or permit fluid to flow through B or C, and to leave via A).

If the valve is merely to serve as an ON/OFF valve so as to permit or interrupt fluid flow between for example A and B, it is merely necessary to block off port C. Alternatively by blocking off B, fluid flow is between A and C.

If fluid flow is from A to B (or C) in an ON/OFF configuration of the valve, then the pressure of the fluid in the chamber 110 (see FIG. 27) will tend to assist in keeping the armature in the home position of the armature which is interrupting flow.

In order to reduce the impact as the armature rocks from one position to the other, springs 162, 164 are provided in passages 166, 168 in the pole pieces 134, 136 respectively. The springs are held captive between closures 170, 172 and balls 174, 176. The latter are held captive by a reduced diameter neck at the inboard end of each passage 166, 168 which permits the balls to protrude beyond the inner faces of the poles 134, 136 but prevent them from leaving the passages completely.

The springs may be compressed by adjusting the position of the closures 170, 172. To this end the passages 166, 168 are formed with an internal screw thread and the closures 170, 172 are formed with a complementary external screw thread and a screwdriver slot is formed in their outward facing ends. By inserting a screwdriver blade in the slot, a closure can be turned so as to move further into, or in a direction out of, the passage, so as to compress its spring to a greater or lesser extent.

As the armature rocks into the position shown in FIG. 27, the ball 174 is engaged by the armature end 118 and will be urged inwardly, thereby compressing (or further compressing) the spring 162, until the armature end engages the inner face of 134.

In doing so, energy is stored in the spring 162 which is available to help accelerate the armature in an opposite sense, when it is induced to rock towards its other home position.

The permanent magnets 112, 114 are selected so as to provide sufficient magnetic flux when the armature is in either of the two home positions to retain the armature in the last position to which it has moved, and to more than overcome any spring force in the compressed spring 162 (or 164) in the pole 134 (or 136) to which it has moved. This is achieved by virtue of the closed magnetic path formed by the armature, the two poles it contacts 134, 140 (or 136, 138), the members 122, 124 and the coil core 128.

Movement of the armature from one position to the other is achieved by introducing magnetic flux in opposition to that established by the magnets 112, 114 so as to cause the armature ends to be repelled from the poles with which they are in contact (e.g. 134, 140) and to be attracted to the other two poles (136, 138).

This can be achieved by moving a powerful permanent magnet near to the device (in which event the coil 126 is not required), but more preferably by causing an electric current to flow through the coil 126 in a direction to create magnetic flux in opposition to that due to the magnets 112, 114. However it is only necessary for the current to flow for the time required for the armature to rock from one set of poles to the other—and with the accelerating effect of the springs 162, 164 this can be a very short period of time.

Clearly the effect of the compressed spring 162 (or 164) acting on the armature will tend to reduce the force exerted by the latter on the surface 108 around the opening 152 (or 154) and which is closed off by the armature in that position.

To counteract this, and further assist the movement of the armature from one home position to the other, the armature may be acted on by a stretched spring which is further extended as the armature moves through its mid position between one home position and the other. This creates a top dead centre position of the armature in which it is momentarily in unstable equilibrium. However as soon as the armature moves beyond this point, the spring begins to exert a turning moment on the armature, tending to move it in the direction it is already moving in, towards the new home position, and will also assist in holding the armature in that position when reached.

Preferably two such springs 178, 180 are provided one on each side of the armature as can be seen in FIGS. 28 and 30. The springs are fitted between two pins 182, 184, one of which protrudes laterally through the bridge section 116 of the armature and the other through the block 144 (or the magnetic member 124).

The spring force exerted by the springs 178, 180 on the armature will of course tend to resist subsequent movement of the armature away from its home position. However this will be partly compensated by the accelerating force of the relevant spring 162 or 164, and may merely require a slightly larger current to flow in the winding 126 to cause the armature to begin to rock towards its other home position. Once beyond the top dead centre (mid-way) position, the effect of the springs 178, 180 will be to assist in closing the valve.

The core 128 is conveniently secured to the upper and lower members 122, 124 by bolts 182, 184 which can be seen in FIGS. 27, 28 and 30.

It has been found that the spring assisted rolling action of the surface 156 into contact with one or other of the openings 152, 154 (see FIG. 31) tends to crush or shift any solids in a fluid which is being controlled by the valve. This allows the valve to be used with unfiltered liquids or air or gases containing particles of dust or sand or the like.

FIG. 29 illustrates the forces acting on the armature and other components, where the forces, pressures, diameters, lengths and angles are denoted as follows:—

| | |
|---|---|
| P [bar] | pressure difference at inlet |
| Φ [mm] | orifice diameter |
| R [mm] | rolling sphere radius |
| K [mm] | spring fitting offset |
| L [mm] | swing bar effective length |
| a [deg.] | spring declination angle |
| b [deg.] | swing bar angular stroke |
| c [deg.] | pivoting force projection angle |
| Fp [N] | pressure force |
| Fh [N] | holding force |
| Fs [N] | spring force |
| Fr [N] | rotating force |
| Fm [N] | magnetic force |
| Ms [Nm] | reversing momentum caused by spring force |
| Mp [Nm] | reversing momentum caused by pressure |
| Mr [Nm] | effective reversing momentum |
| Mh [Nm] | holding momentum |

The following formulae can be used to compute forces and moments, namely:

$$Fp = \Pi \Phi^2 P/4$$

$$\Delta F = Fh - Fp$$

$$Fs = Fh/\cos a$$

$$Fr = Fh \, \text{tg} \, a$$

$$Ms = Fr(R-K)\cos c$$

$$Mp = \Delta F \Phi/2$$

$$Mr = Ms + Mp$$

$$Mh = Fm \, L$$

$$Fm = Mh/L$$

If the following conditions can be assumed to obtain, namely:

| | | |
|---|---|---|
| P = | 60 [bar] | (900 psi) |
| Φ = | 6 [mm] | |
| R = | 13 [mm] | |
| K = | 5 [mm] | |
| L = | 56 [mm] | |
| a = | 7.5 [deg.] | |
| b = | 15.0 [deg.] | |
| c = | 13.2 [deg.] | | then pressure force Fp is given by:

$$Fp = \pi \, 6^2 60/40$$

$$= 169 \, N$$

In order to maintain the valve in a closed state Fh must be greater than Fp.

If a safety margin of 30% is required, then if Fp=169N, Fh must be 220N.

If Fh=220 N then:

$$\Delta F = 220 - 169 = 51 \, N$$

$$Fs = 220/\cos 7.5 = 222 \, N$$

$$Fr = 220 \, \text{tg} \, 7.5 = 29 \, N$$

$$Ms = 29(13-5)\cos 13.2/10^3 = 0.226 \, Nm$$

$$Mp = 51 \, 6/2 \, 10^3 = 0.153 \, Nm$$

$$Mr = 0.226 + 0.153 = 0.379 \, Nm$$

In order to maintain a stable magnetically locked condition, Mh must be greater than Mr. Again, if a 30% safety margin is required, Mh needs to be 0.5 Nm.

From the formulae above, it can be calculated that the magnetic force needs to be 8.9N.

It is quite feasible to attain a magnetic force of this magnitude (which is just less than 1 Kg), since it is possible to obtain a magnetic force of 20N using a rectilinear magnet of 10 mm×10 mm cross section and 20 mm length.

It is to be noted that two magnets such as 112, 114 are not essential, and a single magnet can be employed in their place if desired. Thus the bridge 116 and the two magnets 112, 114 may be replaced by a single magnet.

Alternatively magnets may be omitted from the armature altogether and one or more may be located in the magnetic circuit formed by 122, 128 and 124. Thus for example the core 128 of the electromagnet may be a permanent magnet. It is merely necessary that the permanent magnet(s) cause poles 134 and 138 to have the same magnetic polarity, opposite to that of poles 135 and 140.

I claim:

1. A magnetic drive for a fluid flow control valve comprising permanent magnet means generating magnetic flux between pairs of poles, an armature mounted for movement enabling said armature to occupy either a rest position in a first air gap between one pair of poles in which the flux is in one direction, or a rest position in a second air gap between another pair of poles in which the flux is in the opposite direction, with a region of flux cancellation between the two air gaps, and at least one electromagnet winding having an axis generally perpendicular to the path of movement of the armature to which current can be supplied to produce a magnetic flux in said one direction or the other, depending on the direction of the current, the flux from the winding increasing the flux density in the other air gap, thereby effectively shifting the flux cancellation region towards or into one of the two air gaps so as to produce a flux density gradient extending from one air gap to the other which will cause the armature to move into (or remain in) the air gap having the higher flux density, in which the armature will continue to remain after the current flow ceases, and wherein energy storing means is provided engagable by the armature at one end of the armature travel which is only engaged as the armature approaches said armature's rest position, thereby to absorb energy from the final movement of the armature into said armature's rest position at that end, of said armature's travel.

2. A magnetic drive as claimed in claim 1, wherein said energy storing means engagable by the armature only as said armature approaches its rest position, is located at both ends of the armature travel.

3. A magnetic drive as claimed in claim 1, wherein in use the winding both polarizes the armature and changes the magnetic flux in the air gaps.

4. A magnetic drive as claimed in claim 1, which further includes low reluctance flux concentrating means external to the electromagnet winding which provides a low reluctance external path for returning flux from one end to the other thereof when the winding is energized, thereby to increase the flux produced by the winding when energized, so as to magnify the magnetic flux available to effect movement of the armature.

5. A magnetic drive as claimed in claim 1 when located within a housing containing a fluid tight chamber and at least one fluid flow control valve operated between open and closed positions by movement of the armature for controlling the flow of fluid through the chamber.

6. A magnetic drive as claimed in claim 5 in where the valve is adapted to control the flow of a liquid or a gas or air.

7. A magnetic drive as claimed in claim 1, wherein magnetic poles are located at opposite ends of the drive with a gap between the two pairs of opposed magnetic pole faces, the armature includes a magnetisable part which will just fit in the gap between the pair of opposed pole faces at opposite ends of the drive, said magnetisable part of the armature being secured to one end of a low mass connecting rod which extends through an end of the magnetic drive to terminate externally thereof.

8. A fluid flow control valve comprising a fluid tight chamber to which or from which fluid can flow via a first passage, an elongate magnetic armature which constitutes the fluid flow controlling device and is movable between two home positions between two pairs of magnetic poles, and which in doing so passes through a mid position between the two home positions, a permanent magnet the flux from which links the armature and the poles in each home position and will cause the armature to move towards and remain between two of the poles in each home position, an electromagnet which when energized by an appropriate flow of current will alter the magnetic flux to cause the armature to be repelled from two poles between which said armature extends and to move through said armature's mid position and thereafter towards the other two poles defining the other home position, a second fluid passage which is open to convey fluid into and out of the chamber when the armature occupies one home position but is closed by the armature when said armature occupies said armature's other home position, and energy storage means which has no effect of the armature in or near said armature's mid position, but is engaged by the armature as said armature approaches each of said armature's two home positions and resists the final movement of the armature into each home position.

9. A valve as claimed in claim 8 wherein the chamber is formed at least in part from plastics or glass or quartz.

10. A valve as claimed in claim 8 wherein the valve is adapted to control the flow of a liquid or a gas or air.

11. A fluid flow control valve in which an armature is mounted for pivoting in a fluid tight chamber to which or from which fluid can flow via a first passage, and the armature comprises the fluid flow controlling device and can adopt either of two home positions in each of which said armature is held in contact with two magnetic poles by magnetic flux provided by a permanent magnet, wherein the armature is caused to pivot from one home position to the other by temporarily altering the magnetic flux linking the armature and the poles so that the armature is repelled from poles with which said armature is in contact and attracted to poles defining the other home position, and wherein a second fluid passage is provided through one of the poles which communicates with an opening in the pole face, which opening is covered by the armature so as to prevent fluid flow between the second passage and the chamber when the latter is in one of said armature's two home positions but is uncovered to permit fluid flow through the second passage when the armature occupies the other home position.

12. A valve as claimed in claim 11 wherein a third fluid passage leading to a second opening in another pole is provided which second opening will be covered when the armature occupies said armature's said other home position.

13. A valve as claimed in claim 11 comprising four similar pole-pieces arranged in two pairs, associated with opposite ends of the armature, each pair presenting a North and South pole to the armature, and the two pairs are arranged symmetrically about the central pivoting axis of the armature.

14. A valve as claimed in claim 13 wherein at least one permanent magnet is linked to the pole-pieces to provide a permanent magnetic flux so that the two poles on one side of the armature have the same magnetic polarity as do the two poles on the other side of the armature.

15. A valve as claimed in claim 13 wherein the poles are linked by magnetic material to form a flux path between the poles on one side and the poles on the other side of the armature, and the armature includes at least one permanent magnet to provide a permanent magnetic flux and create a North pole at one end and a South pole at the other end of the armature.

16. A valve as claimed in claim 13 wherein all four poles have a similar passage therein so as to have a similar magnetic cross-section.

17. A valve as claimed in claim 16 in which two of the passages house resiliently deformable energy storing means each of which will be deformed to store energy as the armature approaches the pole containing the energy storing means, but from which the armature becomes disengaged as it moves away towards the other pole.

18. A valve as claimed in claim 17 wherein a thrust member is provided in each passage between the resilient means and the open end of the passage which protrudes beyond the open end of the passage to be engaged by the armature as the latter moves towards and into contact with the pole, for transmitting armature movement to the resilient means.

19. A valve as claimed in claim 18 wherein the thrust member is held captive in the passage but is slidable therein.

20. A valve as claimed in claim 17 wherein each energy storing means comprises a spring.

21. A valve as claimed in claim 11 wherein a closed flux path for the permanent flux is created when the armature occupies either of its two home positions.

22. A valve as claimed in claim 11 wherein the armature is mounted for rocking about a ridge defining a fulcrum, or between an opposed pair of such ridges or for pivoting about an axis defined by a pin about which the armature can rotate.

23. A valve as claimed in claim 11 wherein the armature extends in an axial sense through an electromagnet having a winding through which electric current can flow and is polarized magnetically in one sense when a current flows in one direction in the winding and in an opposite sense when a current flows in the opposite direction.

24. A valve as claimed in claim 15 wherein the magnetic material linking the poles comprises at least in part the core of an electromagnet having a winding through which current flow in one sense will alter the magnetic flux so as to reverse the polarity of the poles created by the permanent magnet flux.

25. A valve as claimed in claim 23 wherein the residual permanent magnet flux linking the armature in each home position is sufficient to hold the armature in that home position, so that the device has a bistable characteristic, and causing a pulse of current to flow in the electromagnet winding in the appropriate direction, causes the armature to move from one home position to the other, where said armature will remain due to the residual permanent magnet flux linking said armature to the other poles to which said armature has moved.

26. A valve as claimed in claim 24 wherein the residual permanent magnet flux linking the armature in each home position is sufficient to hold the armature in that home position, so that the device has a bistable characteristic, and causing a pulse of current to flow in the electromagnet winding in the appropriate direction, causes the armature to move from one home position to the other, where said armature will remain due to the residual permanent magnet flux linking said armature to the other poles to which said armature has moved.

27. A valve as claimed in claim 11 wherein the movement of the armature is employed to open or close a second valve external to the device, or to open and close an electrical switch or perform a mechanical function externally of the device.

28. A valve as claimed in claim 27 wherein armature movement is transmitted to an external device by means of a push rod.

29. A valve as claimed in claim 28 wherein the push rod extends through a passage in one of the poles.

30. A valve as claimed in claim 28 wherein the push rod extends through one or other of the poles containing a fluid conveying passage.

31. A valve as claimed in claim 28 wherein the push rod extends through a passage containing an energy storing spring.

32. A valve as claimed in claim 31 wherein the push rod is linked to the spring to be urged by the spring towards the armature, and stop means prevents the push rod from following the armature all the way to its mid position between the poles so that the armature is free of spring influence over part of its travel from between the poles.

33. A valve as claimed in claim 11 in which the actuator is bi-stable in that after the permanent magnetic flux is altered to produce the pivoting see-saw action of the armature, the magnetic flux linking the armature and poles in the low reluctance path now established, is sufficient to cause the armature to remain in that position in contact with those poles, and will remain there until the magnetic flux linking the armature and the poles is altered, so as to cause the armature to disengage from those two poles and transfer to the other two.

34. A valve as claimed in claim 33 wherein the flux alteration is effected by moving a magnet into proximity with the device so as to at least temporarily reduce the permanent magnet holding flux, to cause the armature to move to its other home position.

35. A valve as claimed in claim 33 wherein the magnet reverses the flux linking the armature.

36. A valve as claimed in claim 33 wherein the flux alteration is achieved by causing an electric current to flow in a winding of an electromagnet surrounding the armature.

37. A valve as claimed in claim 11 wherein the magnetic flux change to cause the armature to move to the other home position is sufficient to oppositely magnetically polarize the armature.

38. An actuator comprising an elongate magnetisable armature which is pivotable in a see-saw manner between two home positions in contact with poles of magnetic material and in doing so passes through a mid position equidistant from the poles, but will remain in one home position or the other due to magnetic attraction between said armature and two of the poles, wherein a closed low reluctance path for magnetic flux is created by the armature making contact with two of the poles when in each home position and the low reluctance path includes at least one permanent magnet the flux from which creates the force of attraction between the armature and the home position poles with which said armature is in contact, thereby maintaining the armature in that home position, an electromagnet having a winding through which electric current can flow, and which, when energized by an appropriate current flow, will alter the magnetic flux so as to cause the armature to be repelled from the poles with which the armature is in contact and be attracted to, and caused to transfer to the other two poles, and further comprising resilient energy storage means disposed at the poles, which has no effect on the armature in or near said mid position but as the armature approaches the poles, resists the final movement of the armature towards the poles.

39. An actuator as claimed in claim 38 wherein the or each permanent magnet comprises part of the armature.

40. An actuator as claimed in claim 38 wherein the or each permanent magnet comprises part of the low reluctance path external to the armature.

41. An actuator as claimed in claim 38 wherein each resilient energy storage means is selected so that said storage means will exert an increasing force on the armature as said armature moves towards the pole which will decelerate the armature as said armature approaches the pole but is insufficient to overcome the increasing force of magnetic attraction between the armature and the pole as the former closes on the latter, thereby to reduce the impact force as the armature contacts the pole and to store energy from the deceleration of the armature which energy is available to accelerate the armature away from the pole if the magnetic flux attracting the armature to the pole is subsequently reduced.

42. An actuator as claimed in claim 38 wherein the armature is mounted for pivoting about a ridge which constitutes a fulcrum or a fixed axis defined by a pin.

43. An actuator as claimed in claim 38 wherein the permanent magnet, pole pieces and electromagnet, are contained within a housing.

44. An actuator as claimed in claim 38 wherein the resilient energy storage means acts between the armature and a fixed point.

45. An actuator as claimed in claim 38 wherein the resilient energy storage means is carried by and extends from the armature or is attached to and extends from at least one of the poles.

46. An actuator as claimed in claim 38 wherein the resilient energy storage means is housed in recesses in two of the poles.

47. An actuator as claimed in claim 46 wherein a thrust member is housed in each recess and protrudes from the face of the pole, which will be engaged by the armature and pushed into its recess to compress the resilient energy storage means therein as the armature approaches the pole.

48. An actuator as claimed in claim 38 wherein movement of the armature is transmitted externally of the housing.

49. An actuator comprising a bi-stable rocking armature which is movable between two home positions each defined by a pair of poles, by altering magnetic flux created by at least one permanent magnet and linking the armature and the poles when said armature occupies one of said armature's home positions, so as to cause the armature to rock like a see-saw into the other of said armature's two home positions, in each of which a closed low reluctance path for the magnetic flux linking the armature and two of the poles is created, the permanent magnetic flux alone which links the armature in either home position, being sufficient to cause the armature to remain in that position in contact with those two poles until the flux linking the armature to those two poles is altered so as to cause the armature to disengage therefrom and see-saw over to the other two poles, where said armature will remain due to the closed low reluctance path now established with these other two poles, and further comprising compressible energy converting and storing means disposed at the poles, which in use during the final movement of the armature into contact with the poles is compressed and converts some of the kinetic energy of the armature into potential energy and stores the potential energy while the armature remains in contact with the poles in either home position, to be available to exert an accelerating force on the armature in a direction away from that home position towards said armature's other home position when the magnetic flux linking the armature is altered to allow this to happen.

50. An actuator as claimed in claim 49 wherein the deformable energy converting and storing means comprises two resiliently deformable devices one of which is deformed in use to store energy therein as the armature moves into engagement with one pair of poles, and the other of which is deformed in use to store energy therein as the armature moves into engagement with the other pair of poles.

51. An actuator as claimed in claim 50 wherein the energy converting and storing means is housed in recesses in two of the poles.

52. An actuator as claimed in claim 51 wherein a thrust member is housed in each recess and protrudes from the face of the pole, which in use will be engaged by the armature and pushed into its recess to compress the resiliently deformable energy converting storing means therein as the armature approaches the pole.

53. An actuator as claimed in claim 49 wherein movement of the armature is transmitted in use externally of the housing.

54. An actuator as claimed in claim 53 wherein the armature movement is transmitted by means of push rod means which is engageable by the armature during movement of the latter, and extends through one or more passages in the poles.

55. An actuator as claimed in claim 54 wherein a passage containing the push rod means also contains a compressible spring, and the push rod means extends through and is linked to the spring to be urged by the spring towards the armature, and stop means prevents the push rod means from following the armature in use all the way to its mid position between the poles so that the armature is free of spring influence over part of its travel between poles.

56. An actuator as claimed in claim 55 wherein the compressible spring serves as a deformable energy converting and storing means.

57. An actuator as claimed in claim 49 in which the or each permanent magnet forms part of the armature.

58. An actuator as claimed in claim 49 in which the or each permanent magnet forms part of the low reluctance path out with the armature.

59. An actuator as claimed in claim 54 wherein the flux alteration required in use to effect the changeover of the armature from one pole to the other is effected by causing a short pulse of current to flow through an electromagnet winding which influences the flux linking the armature and the poles, the direction of the current in each pulse to effect each changeover being selected accordingly.

60. An actuator as claimed in claim 59 wherein the permanent magnet, armature, pole pieces and electromagnet, are contained within a housing.

61. An actuator as claimed in claim 60 wherein the housing is formed from magnetisable material and comprises part of the magnetic flux path.

62. An actuator as claimed in claim 49 wherein the energy converting and storing means acts between the armature and a fixed point in the housing.

63. An actuator as claimed in claim 49 wherein the energy converting and storing mean as acts between the armature and at least one of the poles.

* * * * *